US012771226B2

(12) United States Patent
Ushikubo

(10) Patent No.: US 12,771,226 B2
(45) Date of Patent: Oct. 20, 2026

(54) ELECTRIC POWER CONVERSION APPARATUS AND ELECTRIC POWER CONVERSION SYSTEM

(71) Applicant: TDK CORPORATION, Tokyo (JP)

(72) Inventor: Ryosuke Ushikubo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 104 days.

(21) Appl. No.: 19/006,900

(22) Filed: Dec. 31, 2024

(65) Prior Publication Data

US 2025/0233499 A1 Jul. 17, 2025

(30) Foreign Application Priority Data

Jan. 11, 2024 (JP) ................................ 2024-002583
Oct. 10, 2024 (JP) ................................ 2024-177671

(51) Int. Cl.
*H02M 3/335* (2006.01)
*H02M 1/00* (2006.01)
*H02M 1/34* (2007.01)

(52) U.S. Cl.
CPC ..... *H02M 1/0038* (2021.05); *H02M 3/33576* (2013.01); *H02M 1/348* (2021.05)

(58) Field of Classification Search
CPC .... H02M 1/4258; H02M 1/34; H02M 1/4208; H02M 1/4225; H02M 1/0058; H02M 1/4241; H02M 1/36; H02M 1/32; H02M 1/425; H02M 1/42; H02M 1/007; H02M 1/0006; H02M 1/10; H02M 1/342; H02M 3/33507; H02M 3/01; H02M 3/28; H02M 3/335; H02M 3/33592; H02M 3/33523; H02M 3/158; H02M 3/33576; H02M 3/3353; H02M 3/33569; H02M 3/155; H02M 3/285; H02M 3/1584; H02M 3/156; H02M 3/1582; H02M 3/33546; H02M 3/33584; H02M 3/3376; H02M 3/33573; H02M 3/33571; H02M 3/1563; H02M 3/33561
See application file for complete search history.

(56) References Cited

U.S. PATENT DOCUMENTS

2022/0109365 A1 * 4/2022 Shiomi ............ H02M 3/33576

FOREIGN PATENT DOCUMENTS

JP 2018-061381 A 4/2018

* cited by examiner

*Primary Examiner* — Bryan R Perez
(74) *Attorney, Agent, or Firm* — Oliff PLC

(57) ABSTRACT

An electric power conversion apparatus includes a first electric power terminal, a switching circuit, a transformer, a rectifying circuit, a smoothing circuit, an electric power regeneration circuit, a control circuit, and a second electric power terminal. The electric power regeneration circuit includes a diode circuit, a second capacitor, first and second regeneration switching devices, a second inductor, and a first diode. The control circuit is configured to, when a voltage at a first node increases and exceeds a threshold voltage, cause the first regeneration switching device to be on and cause the second regeneration switching device to be off. A first positive voltage and a first negative voltage are to alternately occur across a second winding. The threshold voltage is higher than each of a voltage corresponding to an average value of the first positive voltage and a voltage corresponding to an average value of the first negative voltage.

10 Claims, 13 Drawing Sheets

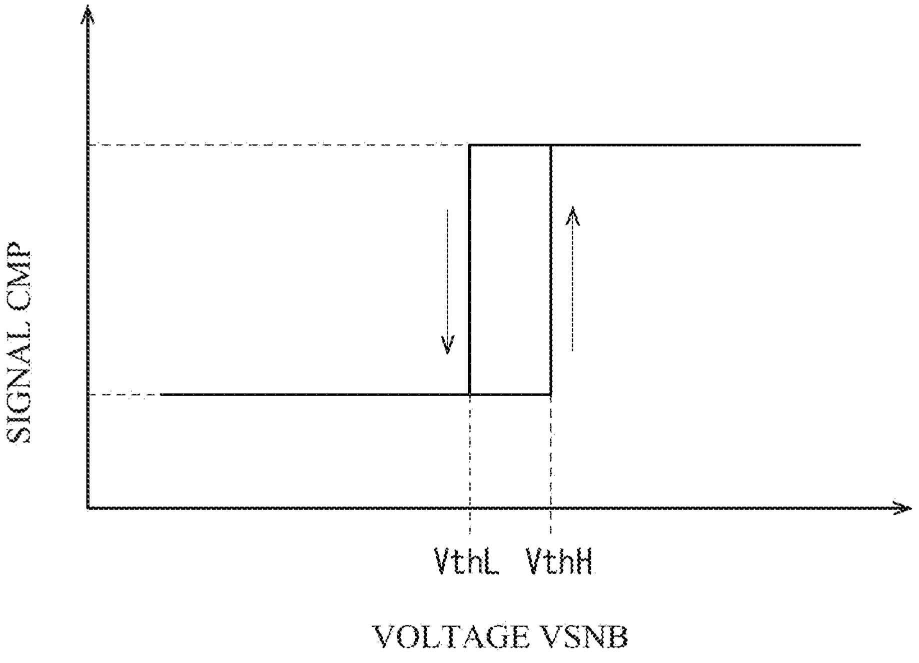
FIG. 3
FIG. 4A
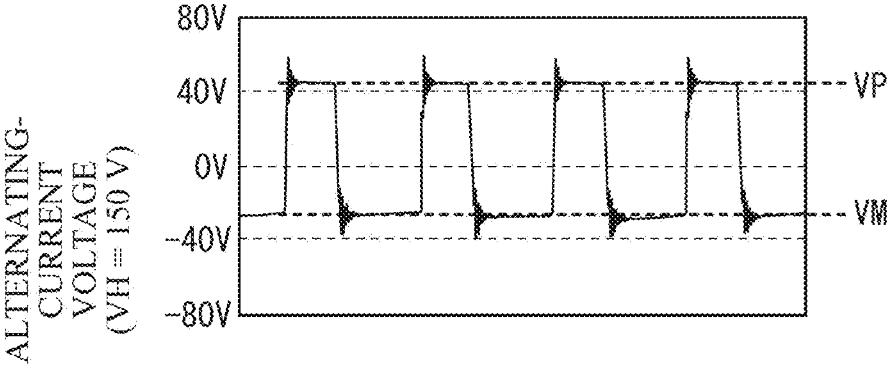
FIG. 4B
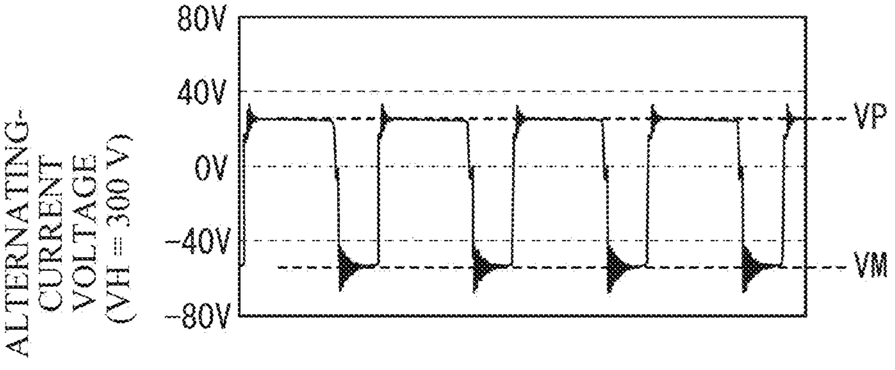

ELECTRIC POWER CONVERSION APPARATUS AND ELECTRIC POWER CONVERSION SYSTEM

CROSS-REFERENCE TO RELATED APPLICATIONS

The present application claims priority from Japanese Patent Application No. 2024-002583 filed on Jan. 11, 2024 and Japanese Patent Application No. 2024-177671 filed on Oct. 10, 2024, the entire contents of each of which are hereby incorporated by reference.

BACKGROUND

The disclosure relates to an electric power conversion apparatus and an electric power conversion system that each convert electric power.

Some electric power conversion apparatuses suppress a surge voltage that occurs in a rectifying circuit. For example, Japanese Unexamined Patent Application Publication No. 2018-061381 discloses an electric power conversion apparatus that helps to suppress a surge voltage for various input voltages by changing a reference voltage, based on an input voltage supplied to a switching circuit.

SUMMARY

An electric power conversion apparatus according to one embodiment of the disclosure includes a first electric power terminal, a switching circuit, a transformer, a rectifying circuit, a smoothing circuit, an electric power regeneration circuit, a control circuit, and a second electric power terminal. The switching circuit is coupled to the first electric power terminal. The transformer includes a first winding and a second winding. The first winding is led to the switching circuit. The rectifying circuit is coupled to the second winding and includes one or more rectification switching devices. The smoothing circuit includes a first inductor and a first capacitor. The first inductor has a first end and a second end. The first capacitor has a first end coupled to the second end of the first inductor, and a second end coupled to a reference node. The electric power regeneration circuit is coupled to the rectifying circuit and is configured to allow energy of a surge voltage that occurs in the rectifying circuit to be regenerated in the first capacitor. The control circuit is configured to control an operation of each of the switching circuit, the rectifying circuit, and the electric power regeneration circuit. The second electric power terminal includes a first coupling terminal and a second coupling terminal. The first coupling terminal is coupled to the second end of the first inductor and the first end of the first capacitor. The second coupling terminal is coupled to the reference node. The electric power regeneration circuit includes a diode circuit, a second capacitor, a first regeneration switching device, a second regeneration switching device, a second inductor, and a first diode. The diode circuit is provided on a path coupling the rectifying circuit and a first node to each other. The diode circuit is configured to allow a current to flow toward the first node. The second capacitor has a first end coupled to the first node, and a second end coupled to the reference node. The first regeneration switching device has a first end coupled to the first node, and a second end coupled to a second node. The second regeneration switching device has a first end coupled to the second node, and a second end coupled to the reference node. The second inductor and the first diode are provided on a path coupling the second node and the first end of the first capacitor to each other. The control circuit is configured to, when a voltage at the first node increases and exceeds a threshold voltage, cause the first regeneration switching device to switch from off to on and cause the second regeneration switching device to switch from on to off. A first positive voltage and a first negative voltage are to alternately occur across the second winding, when an input voltage inputted to the first electric power terminal is within a normal operation voltage range. The threshold voltage is higher than each of a voltage at the rectifying circuit corresponding to an average value of the first positive voltage and a voltage at the rectifying circuit corresponding to an average value of the first negative voltage.

An electric power conversion system according to one embodiment of the disclosure includes an electric power conversion apparatus. The electric power conversion apparatus includes a first electric power terminal, a switching circuit, a transformer, a rectifying circuit, a smoothing circuit, an electric power regeneration circuit, a control circuit, and a second electric power terminal. The switching circuit is coupled to the first electric power terminal. The transformer includes a first winding and a second winding. The first winding is led to the switching circuit. The rectifying circuit is coupled to the second winding and includes one or more rectification switching devices. The smoothing circuit includes a first inductor and a first capacitor. The first inductor has a first end and a second end. The first capacitor has a first end coupled to the second end of the first inductor, and a second end coupled to a reference node. The electric power regeneration circuit is coupled to the rectifying circuit and is configured to allow energy of a surge voltage that occurs in the rectifying circuit to be regenerated in the first capacitor. The control circuit is configured to control an operation of each of the switching circuit, the rectifying circuit, and the electric power regeneration circuit. The second electric power terminal includes a first coupling terminal and a second coupling terminal. The first coupling terminal is coupled to the second end of the first inductor and the first end of the first capacitor. The second coupling terminal is coupled to the reference node. The electric power regeneration circuit includes a diode circuit, a second capacitor, a first regeneration switching device, a second regeneration switching device, a second inductor, and a first diode. The diode circuit is provided on a path coupling the rectifying circuit and a first node to each other. The diode circuit is configured to allow a current to flow toward the first node. The second capacitor has a first end coupled to the first node, and a second end coupled to the reference node. The first regeneration switching device has a first end coupled to the first node, and a second end coupled to a second node. The second regeneration switching device has a first end coupled to the second node, and a second end coupled to the reference node. The second inductor and the first diode are provided on a path coupling the second node and the first end of the first capacitor to each other. The control circuit is configured to, when a voltage at the first node increases and exceeds a threshold voltage, cause the first regeneration switching device to switch from off to on and cause the second regeneration switching device to switch from on to off. A first positive voltage and a first negative voltage are to alternately occur across the second winding, when an input voltage inputted to the first electric power terminal is within a normal operation voltage range. The threshold voltage is higher than each of a voltage at the rectifying circuit corresponding to an average value of the first positive voltage and a voltage at the rectifying circuit corresponding to an average value of the first negative voltage.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 3 is an explanatory diagram illustrating an operation example of a comparator illustrated in FIG. 2.

FIG. 4A is an explanatory diagram illustrating an example of a threshold voltage illustrated in FIG. 3.

FIG. 4B is an explanatory diagram illustrating another example of the threshold voltage illustrated in FIG. 3.

DETAILED DESCRIPTION

Figure 1:
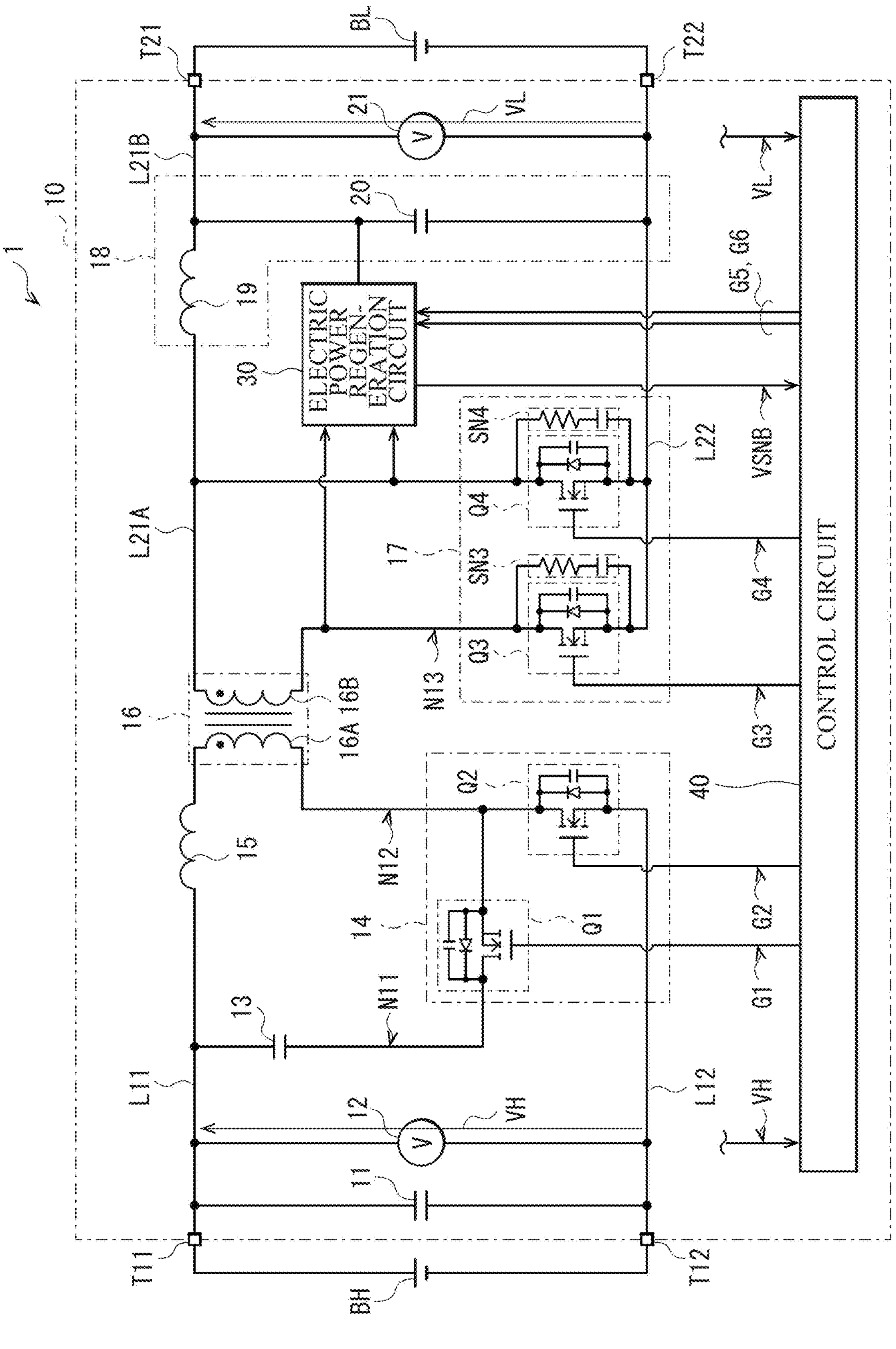
FIG. 1 is a circuit diagram illustrating a configuration example of an electric power conversion system according to one example embodiment of the disclosure.

What is desired of an electric power conversion apparatus is to make it possible to protect a circuit even upon a sharp change in input voltage. The electric power conversion apparatus is thus expected to allow for protection of a circuit that suppresses such a surge voltage.

It is desirable to provide an electric power conversion apparatus and an electric power conversion system that each make it possible to protect a circuit even upon a sharp change in input voltage.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

Configuration Example

FIG. 1 illustrates a configuration example of an electric power conversion system 1 including an electric power conversion apparatus according to an example embodiment of the disclosure. The electric power conversion system 1 may include a high voltage battery BH, an electric power conversion apparatus 10, and a low voltage battery BL. The electric power conversion system 1 may be configured to convert electric power supplied from the high voltage battery BH and to supply the converted electric power to the low voltage battery BL.

The high voltage battery BH may be configured to store electric power. The high voltage battery BH may supply the electric power to the electric power conversion apparatus 10.

The electric power conversion apparatus 10 may be configured to step down a voltage received from the high voltage battery BH to thereby convert the electric power, and to supply the converted electric power to the low voltage battery BL. The electric power conversion apparatus 10 may include terminals T11 and T12, a capacitor 11, a voltage sensor 12, a capacitor 13, a switching circuit 14, an inductor 15, a transformer 16, a rectifying circuit 17, a smoothing circuit 18, an electric power regeneration circuit 30, a voltage sensor 21, a control circuit 40, and terminals T21 and T22. Primary-side circuitry of the electric power conversion system 1 may include the high voltage battery BH, the capacitor 11, the voltage sensor 12, the capacitor 13, the switching circuit 14, and the inductor 15. Secondary-side circuitry of the electric power conversion system 1 may include the rectifying circuit 17, the smoothing circuit 18, the electric power regeneration circuit 30, the voltage sensor 21, and the low voltage battery BL.

The terminals T11 and T12 may be configured to receive a voltage from the high voltage battery BH. In the electric power conversion apparatus 10, the terminal T11 may be coupled to a voltage line L11, and the terminal T12 may be coupled to a reference voltage line L12.

The capacitor 11 may have a first end coupled to the voltage line L11, and a second end coupled to the reference voltage line L12.

The voltage sensor 12 may have a first end coupled to the voltage line L11, and a second end coupled to the reference voltage line L12. The voltage sensor 12 may be configured to detect a voltage VH at the voltage line L11 with respect to a voltage at the reference voltage line L12.

The capacitor 13 may have a first end coupled to the voltage line L11, and a second end coupled to a node N11.

The switching circuit 14 may be configured to perform a switching operation, based on control signals G1 and G2. The switching circuit 14 may include transistors Q1 and Q2. The transistors Q1 and Q2 may be switching devices that perform switching operations, respectively based on the control signals G1 and G2. The transistors Q1 and Q2 may each include an N-type field-effect transistor (FET), for example. The transistors Q1 and Q2 may each include a body diode and a parasitic capacitor. For example, the body diode of the transistor Q1 may have an anode coupled to a source of a body of the transistor Q1, and a cathode coupled to a drain of the body of the transistor Q1. The parasitic capacitor of the transistor Q1 may have a first end coupled to the source of the body of the transistor Q1, and a second end coupled to the drain of the body of the transistor Q1. This may similarly apply to the transistor Q2. Note that although the N-type field-effect transistor may be used in this example embodiment, this is non-limiting, and any kind of switching device may be used. The drain of the transistor Q1 may be coupled to the node N11, the source of the transistor Q1 may be coupled to a node N12, and a gate of the transistor Q1 may receive the control signal G1. A drain of the transistor Q2 may be coupled to the node N12, a source of the transistor Q2 may be coupled to the reference voltage line L12, and a gate of the transistor Q2 may receive the control signal G2.

The inductor 15 may have a first end coupled to the voltage line L11, and a second end coupled to a winding 16A of the transformer 16. The winding 16A will be described later.

The transformer 16 may be configured to isolate the primary-side circuitry and the secondary-side circuitry from each other, and to convert an alternating-current voltage supplied from the primary-side circuitry with a transformation ratio of the transformer 16 to thereby supply the converted alternating-current voltage to the secondary-side circuitry. The transformer 16 may include the winding 16A and a winding 16B. The winding 16A may be a primary winding of the transformer 16. The winding 16A may have a first end coupled to the second end of the inductor 15, and a second end coupled to the node N12. The winding 16B may be a secondary winding of the transformer 16. The winding 16B may have a first end coupled to a voltage line L21A, and a second end coupled to a node N13. The voltage line L21A will be described later.

The rectifying circuit 17 may be configured to rectify the alternating-current voltage outputted from the winding 16B of the transformer 16. The rectifying circuit 17 may include transistors Q3 and Q4 and snubber circuits SN13 and SN14. The transistors Q3 and Q4 may be switching devices that perform switching operations, respectively based on control signals G3 and G4. The transistors Q3 and Q4 may each include, for example, an N-type field-effect transistor, as with the transistors Q1 and Q2. The transistors Q3 and Q4 may each include a body diode and a parasitic capacitor, as with the transistors Q1 and Q2. The transistor Q3 may have a drain coupled to the node N13, a source coupled to a reference voltage line L22, and a gate that receives the control signal G3. The transistor Q4 may have a drain coupled to the voltage line L21A, a source coupled to the reference voltage line L22, and a gate that receives the control signal G4. The snubber circuit SN3 may be configured to suppress a change in voltage between the drain and the source of the transistor Q3. The snubber circuit SN4 may be configured to suppress a change in voltage between the drain and the source of the transistor Q4. The snubber circuits SN3 and SN4 may each include a resistor and a capacitor that are coupled in series to each other. The snubber circuit SN3 may have a first end coupled to the drain of the transistor Q3, and a second end coupled to the source of the transistor Q3. The snubber circuit SN4 may have a first end coupled to the drain of the transistor Q4, and a second end coupled to the source of the transistor Q4.

The smoothing circuit 18 may be configured to smooth the voltage rectified by the rectifying circuit 17. The smoothing circuit 18 may include an inductor 19 and a capacitor 20. The inductor 19 may have a first end coupled to the voltage line L21A, and a second end coupled to a voltage line L21B. The capacitor 20 may have a first end coupled to the voltage line L21B, and a second end coupled to the reference voltage line L22.

The electric power regeneration circuit 30 may be configured to allow energy of a surge voltage that occurs in each of the transistors Q3 and Q4 of the rectifying circuit 17 to be regenerated in the capacitor 20.

Figure 2:
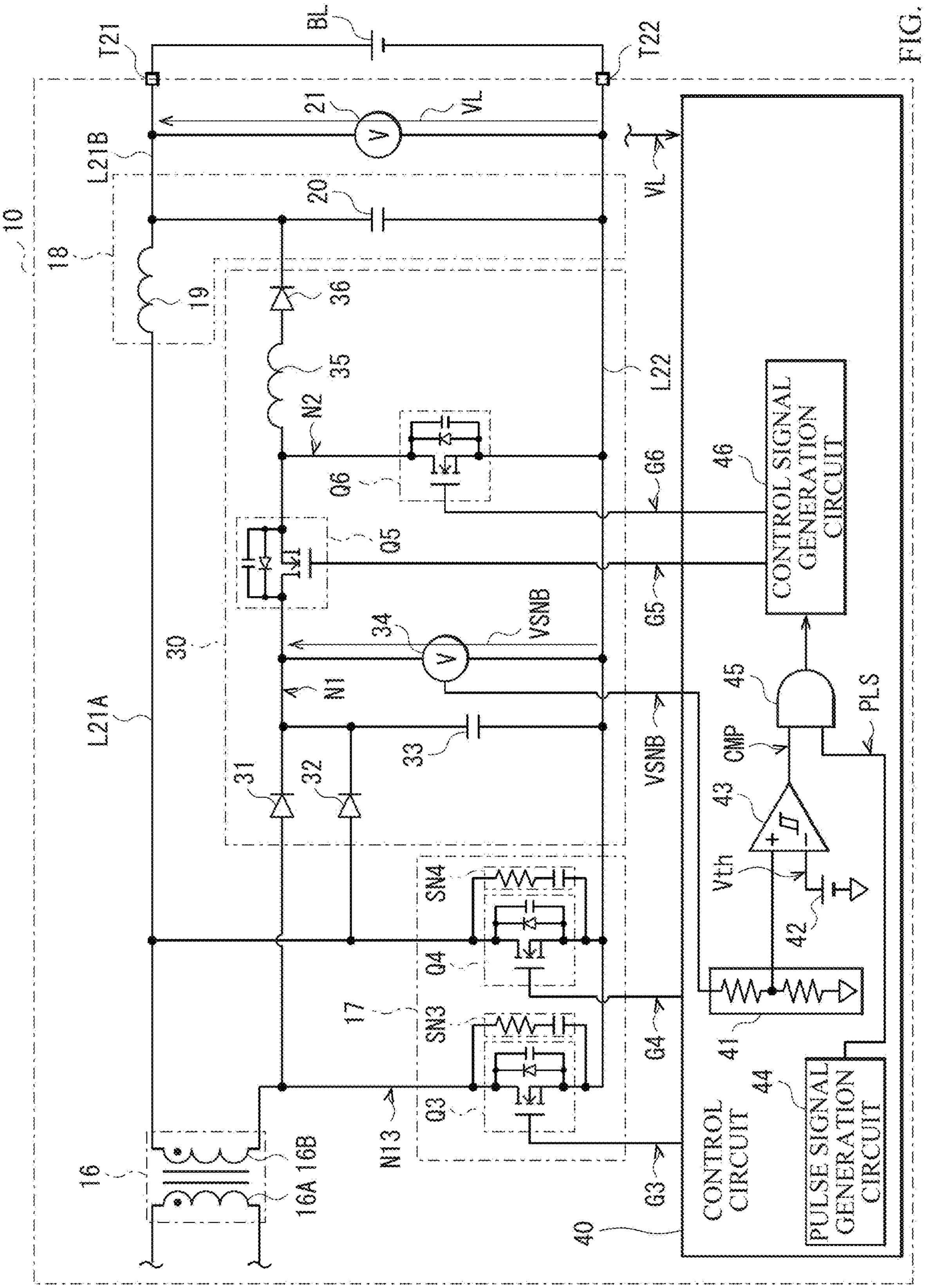
FIG. 2 is a circuit diagram illustrating a configuration example of an electric power regeneration circuit illustrated in FIG. 1.

FIG. 2 illustrates a configuration example of the electric power regeneration circuit 30. FIG. 2 illustrates the secondary-side circuitry of the electric power conversion system 1 including the electric power regeneration circuit 30. The electric power regeneration circuit 30 may include diodes 31 and 32, a capacitor 33, a voltage sensor 34, transistors Q5 and Q6, an inductor 35, and a diode 36.

The diode 31 may have an anode coupled to the node N13, and a cathode coupled to a node N1. The diode 32 may have an anode coupled to the voltage line L21A, and a cathode coupled to the node N1. The capacitor 33 may have a first end coupled to the node N1, and a second end coupled to the reference voltage line L22. The voltage sensor 34 may have a first end coupled to the node N1, and a second end coupled to the reference voltage line L22. The voltage sensor 34 may be configured to detect a voltage VSNB at the node N1 with respect to a voltage at the reference voltage line L22.

The transistors Q5 and Q6 may be switching devices that perform switching operations, respectively based on control signals G5 and G6. The transistors Q5 and Q6 may each include, for example, an N-type field-effect transistor, as with the transistors Q1 to Q4. The transistors Q5 and Q6 may each include a body diode and a parasitic capacitor, as with the transistors Q1 to Q4. The transistor Q5 may have a drain coupled to the node N1, a source coupled to a node N2, and a gate that receives the control signal G5. The transistor Q6 may have a drain coupled to the node N2, a source coupled to the reference voltage line L22, and a gate that receives the control signal G6.

The inductor 35 may have a first end coupled to the node N2, and a second end coupled to an anode of the diode 36. As the inductor 35, for example, an inductor of an integrally molded metal type may be used. This helps to reduce a noise sound, i.e., what is called a noise whine, in the electric power conversion system 1.

The diode 36 may have the anode coupled to the second end of the inductor 35, and a cathode coupled to the first end of the capacitor 20.

Such a configuration makes it possible for the electric power regeneration circuit 30 to allow the energy of the surge voltage that occurs in each of the transistors Q3 and Q4 of the rectifying circuit 17 to be regenerated in the capacitor 20.

The voltage sensor 21 illustrated in FIG. 1 may have a first end coupled to the voltage line L21B, and a second end coupled to the reference voltage line L22. The voltage sensor 21 may be configured to detect a voltage VL at the voltage line L21B with respect to the voltage at the reference voltage line L22.

The control circuit 40 may be configured to control an operation of the electric power conversion apparatus 10, based on the voltage VH detected by the voltage sensor 12, the voltage VL detected by the voltage sensor 21, and the voltage VSNB detected by the voltage sensor 34 of the electric power regeneration circuit 30. The control circuit 40 may include a microcontroller, for example.

For example, based on the voltage VL detected by the voltage sensor 21, the control circuit 40 may so control operations of the transistors Q1 to Q4 respectively with use of the control signals G1 to G4 as to cause the voltage VL to remain at a predetermined voltage. In addition, based on the voltage VSNB detected by the voltage sensor 34 of the electric power regeneration circuit 30, for example, the control circuit 40 may so control operations of the transistors Q5 and Q6 respectively with use of the control signals G5 and G6 as to cause the electric power regeneration circuit 30 to allow the energy of the surge voltage that occurs in the rectifying circuit 17 to be regenerated in the capacitor 20. In addition, for example, based on the voltage VH detected by the voltage sensor 12, the control circuit 40 may so control the operation of the electric power conversion apparatus 10 as to stop the operation of the electric power conversion apparatus 10 when the voltage VH exceeds a maximum voltage Vovp higher than a normal operation voltage range. In this example, the normal operation voltage range may be higher than or equal to 150 V and lower than or equal to 300 V. In this example, the maximum voltage Vovp may be 400 V.

As illustrated in FIG. 2, the control circuit 40 may include a voltage divider circuit 41, a threshold voltage generation circuit 42, a comparator 43, a pulse signal generation circuit 44, an AND circuit 45, and a control signal generation circuit 46.

The voltage divider circuit 41 may be configured to divide the voltage VSNB by a plurality of resistors, in this example. The threshold voltage generation circuit 42 may be configured to generate a threshold voltage Vth.

The comparator 43 may be configured to generate a signal CMP by comparing a voltage resulting from voltage division by the voltage divider circuit 41 and the threshold voltage Vth with each other. The comparator 43 may be a hysteresis comparator, which may have a positive input terminal coupled to the voltage divider circuit 41, a negative input terminal coupled to the threshold voltage generation circuit 42, and an output terminal coupled to the AND circuit 45.

FIG. 3 illustrates an operation example of the voltage divider circuit 41, the threshold voltage generation circuit 42, and the comparator 43. In FIG. 3, a horizontal axis represents the voltage VSNB, and a vertical axis represents the signal CMP. When the signal CMP is at a low level and the voltage VSNB increases and exceeds a threshold voltage VthH, the comparator 43 may change the signal CMP from the low level to a high level. When the signal CMP is at the high level and the voltage VSNB decreases and falls below a threshold voltage VthL, the comparator 43 may change the signal CMP from the high level to the low level. The threshold voltage VthL and the threshold voltage VthH may be determined based on the threshold voltage Vth generated by the threshold voltage generation circuit 42, a hysteresis amount (VthH−VthL), and a voltage division ratio of the voltage divider circuit 41. For example, the threshold voltage VthL and the threshold voltage VthH may be expressed by the following expressions.

$$VthH = 1/\text{voltage division ratio} \times Vth$$

$$VthL = 1/\text{voltage division ratio} \times \{Vth - (VthH - VthL)\}$$

The comparator 43 may thus generate the signal CMP, based on a hysteresis characteristic.

The pulse signal generation circuit 44 may be configured to generate a pulse signal PLS synchronized with the control signals G1 and G2. The AND circuit 45 may be configured to determine an AND of the signal CMP and the pulse signal PLS. The control signal generation circuit 46 may be configured to generate the control signals G5 and G6, based on an output signal from the AND circuit 45.

With this configuration, in the electric power regeneration circuit 30, a flow of the energy of the surge voltage that occurs in the rectifying circuit 17 into the electric power regeneration circuit 30 may allow the capacitor 33 to be charged and the voltage VSNB at the node N1 may increase. In addition, in the electric power regeneration circuit 30, when the voltage VSNB exceeds the threshold voltage VthH, the transistor Q5 may be turned on and the transistor Q6 may be turned off. This may allow the energy of the surge voltage flowing in to be regenerated in the capacitor 20. As illustrated in FIGS. 4A and 4B, a voltage across the winding 16B of the transformer 16 may be an alternating-current voltage that transitions between a voltage VP and a voltage VM. This alternating-current voltage may be a voltage at the node N13 with respect to a potential of the voltage line L21A. The voltage VP may be an average voltage in a period in which the alternating-current voltage is a positive voltage. The voltage VM may be an average voltage in a period in which the alternating-current voltage is a negative voltage. The voltages VP and VM may each vary depending on the voltage VH. For example, as illustrated in FIG. 4A, when the voltage VH is low, an absolute value of the voltage VP may be large and an absolute value of the voltage VM may be small. For example, as illustrated in FIG. 4B, when the voltage VH is high, the absolute value of the voltage VP may be small and the absolute value of the voltage VM may be large. The larger the absolute value of the voltage VP is, the higher a voltage at the drain of the transistor Q3 may be. The larger the absolute value of the voltage VM is, the higher a voltage at the drain of the transistor Q4 may be. The threshold voltages VthH and VthL may each be set to be higher than each of a voltage, at the drain of the transistor Q3, corresponding to the voltage VP and a voltage, at the drain of the transistor Q4, corresponding to the voltage VM, when the voltage VH is within the normal operation voltage range. This helps to prevent, in the electric power regeneration circuit 30, each of the diodes 31 and 32 from being turned on by the voltage VP when the voltage VH is within the normal operation voltage range. It is thus possible for the electric power regeneration circuit 30 to suppress a sharp increase in regenerative electric power when the voltage VH exceeds the normal operation voltage range.

The threshold voltages VthH and VthL may each be set to be lower than a higher one of a voltage, at the drain of the transistor Q3, corresponding to the voltage VP and a voltage, at the drain of the transistor Q4, corresponding to the voltage VM, when the voltage VH is the maximum voltage Vovp (e.g., 400 V) higher than the normal operation voltage range.

This allows, in the electric power regeneration circuit 30, each of the diodes 31 and 32 to be turned on when the voltage VH is close to the maximum voltage Vovp.

The terminals T21 and T22 illustrated in FIG. 1 may be configured to supply electric power generated by the electric power conversion apparatus 10 to the low voltage battery BL. In the electric power conversion apparatus 10, the terminal T21 may be coupled to the voltage line L21B, and the terminal T22 may be coupled to the reference voltage line L22. Further, the terminal T21 may be coupled to a positive terminal of the low voltage battery BL, and the terminal T22 may be coupled to a negative terminal of the low voltage battery BL.

The low voltage battery BL may be configured to store electric power supplied from the electric power conversion apparatus 10.

With this configuration, the electric power conversion system 1 may perform an electric power conversion operation of converting electric power supplied from the high voltage battery BH and supplying the converted electric power to the low voltage battery BL.

Here, the terminals T11 and T12 may correspond to a specific but non-limiting example of a "first electric power terminal" in one embodiment of the disclosure. The switching circuit 14 may correspond to a specific but non-limiting example of a "switching circuit" in one embodiment of the disclosure. The transformer 16 may correspond to a specific but non-limiting example of a "transformer" in one embodiment of the disclosure. The winding 16A may correspond to a specific but non-limiting example of a "first winding" in one embodiment of the disclosure. The winding 16B may correspond to a specific but non-limiting example of a "second winding" in one embodiment of the disclosure. The rectifying circuit 17 may correspond to a specific but non-limiting example of a "rectifying circuit" in one embodiment of the disclosure. The smoothing circuit 18 may correspond to a specific but non-limiting example of a "smoothing circuit" in one embodiment of the disclosure. The inductor 19 may correspond to a specific but non-limiting example of a "first inductor" in one embodiment of the disclosure. The capacitor 20 may correspond to a specific but non-limiting example of a "first capacitor" in one embodiment of the disclosure. The reference voltage line L22 may correspond to a specific but non-limiting example of a "reference node" in one embodiment of the disclosure. The electric power regeneration circuit 30 may correspond to a specific but non-limiting example of an "electric power regeneration circuit" in one embodiment of the disclosure. The terminals T21 and T22 may correspond to a specific but non-limiting example of a "second electric power terminal" in one embodiment of the disclosure. The control circuit 40 may correspond to a specific but non-limiting example of a "control circuit" in one embodiment of the disclosure.

The diodes 31 and 32 may correspond to a specific but non-limiting example of a "diode circuit" in one embodiment of the disclosure. The capacitor 33 may correspond to a specific but non-limiting example of a "second capacitor" in one embodiment of the disclosure. The transistor Q5 may correspond to a specific but non-limiting example of a "first regeneration switching device" in one embodiment of the disclosure. The transistor Q6 may correspond to a specific but non-limiting example of a "second regeneration switching device" in one embodiment of the disclosure. The inductor 35 may correspond to a specific but non-limiting example of a "second inductor" in one embodiment of the disclosure. The diode 36 may correspond to a specific but non-limiting example of a "first diode" in one embodiment of the disclosure. The node N1 may correspond to a specific but non-limiting example of a "first node" in one embodiment of the disclosure. The node N2 may correspond to a specific but non-limiting example of a "second node" in one embodiment of the disclosure. The transistor Q3 may correspond to a specific but non-limiting example of a "first rectification switching device" in one embodiment of the disclosure. The transistor Q4 may correspond to a specific but non-limiting example of a "second rectification switching device" in one embodiment of the disclosure. The diode 31 may correspond to a specific but non-limiting example of a "second diode" in one embodiment of the disclosure. The diode 32 may correspond to a specific but non-limiting example of a "third diode" in one embodiment of the disclosure.

[Operation and Workings]

Next, a description will be given of an operation and workings of the electric power conversion system 1 of the example embodiment.

[Outline of Overall Operation]

First, an outline of an overall operation of the electric power conversion system 1 will be described with reference to FIG. 1. The control circuit 40 may generate the control signals G1 to G4, based on the voltage VL. The switching circuit 14 may perform the switching operation, based on the control signals G1 and G2. The rectifying circuit 17 may perform a switching operation, based on the control signals G3 and G4. The electric power conversion apparatus 10 may thus convert electric power supplied from the high voltage battery BH and may supply the converted electric power to the low voltage battery BL. The control circuit 40 may generate the control signals G5 and G6, based on the voltage VSNB. In the electric power regeneration circuit 30, the transistor Q5 may perform the switching operation, based on the control signal G5, and the transistor Q6 may perform the switching operation, based on the control signal G6. The electric power regeneration circuit 30 may thus allow the energy of the surge voltage that occurs in the rectifying circuit 17 to be regenerated in the capacitor 20.

[Detailed Operation]

An operation example of the electric power conversion system 1 will be described below in detail. First, a description will be given of an operation when the voltage VH is a lower-limit voltage (e.g., 150 V) of the normal operation voltage range, and thereafter, a description will be given of an operation when the voltage VH is an upper-limit voltage (e.g., 300 V) of the normal operation voltage range.

Figure 5:
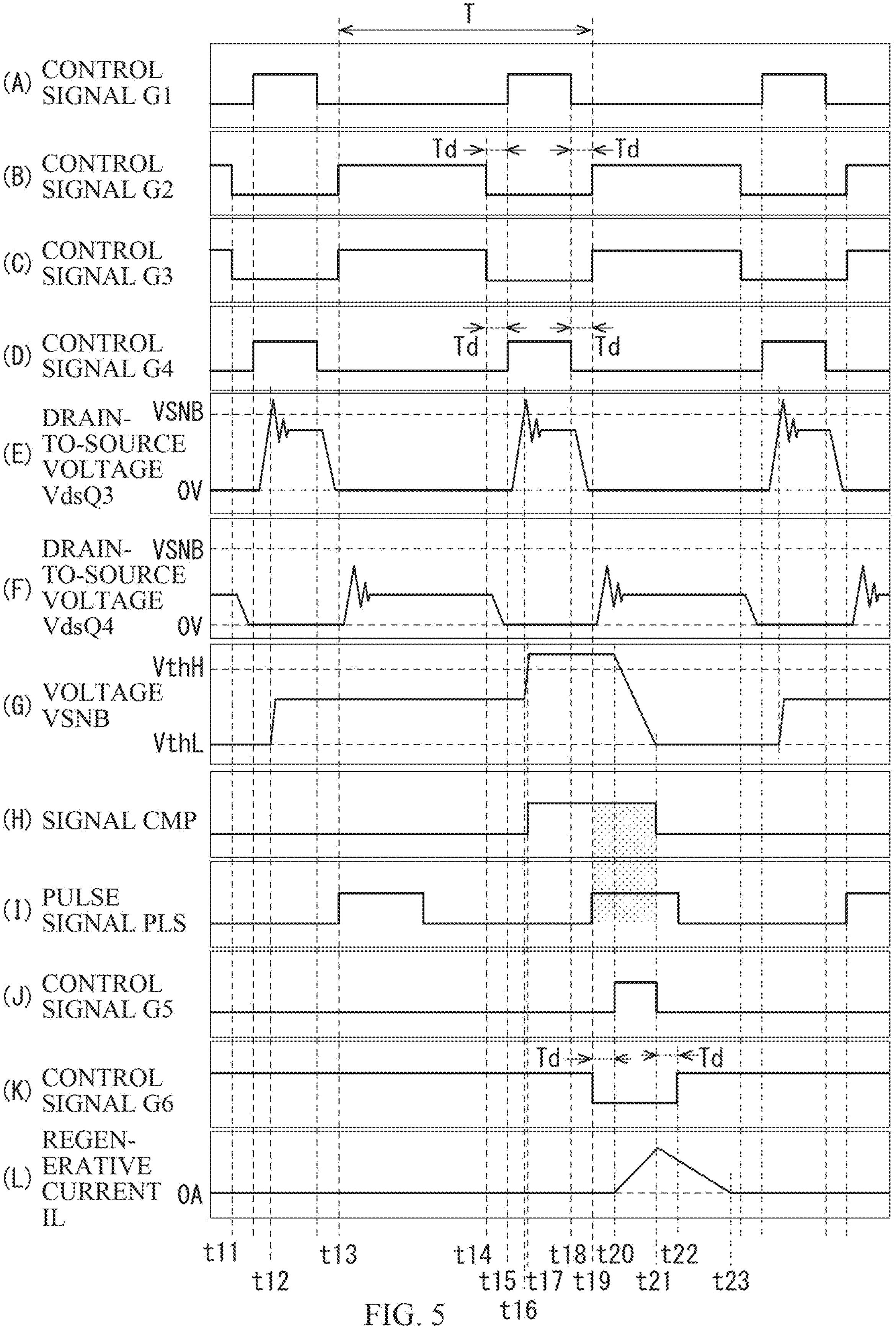
FIG. 5 is a timing waveform diagram illustrating an operation example of the electric power conversion system illustrated in FIG. 1.

FIG. 5 illustrates an operation example of the electric power conversion system 1 when the voltage VH is the lower-limit voltage (e.g., 150 V) of the normal operation voltage range. Parts (A) to (D) of FIG. 5 respectively illustrate waveforms of the control signals G1 to G4. Part (E) of FIG. 5 illustrates a waveform of a drain-to-source voltage VdsQ3 of the transistor Q3. Part (F) of FIG. 5 illustrates a waveform of a drain-to-source voltage VdsQ4 of the transistor Q4. Part (G) of FIG. 5 illustrates a waveform of the voltage VSNB of the capacitor 33 of the electric power regeneration circuit 30. Part (H) of FIG. 5 illustrates a waveform of the signal CMP. Part (I) of FIG. 5 illustrates a waveform of the pulse signal PLS. Parts (J) and (K) of FIG. 5 respectively illustrate waveforms of the control signals G5 and G6. Part (L) of FIG. 5 illustrates a waveform of a regenerative current IL flowing through the inductor 35 of the electric power regeneration circuit 30. In parts (A) to (D), (J), and (K) of FIG. 5, the control signals G1 to G6 are respectively represented based on gate-to-source voltages Vgs of the transistors Q1 to Q6. Note that the voltage VSNB illustrated in each of parts (E) and (F) of FIG. 5 may actually have the waveform illustrated in part (G) of FIG. 5; however, the voltage VSNB is illustrated as a straight line in each of parts (E) and (F) of FIG. 5, because of the scale of the voltage.

The control circuit 40 may generate the control signals G1 to G4, based on the voltage VL (parts (A) to (D) of FIG. 5). The control signals G1 and G2 may be so controlled that either the control signal G1 or the control signal G2 is at a high level. In this case, a dead time Td may be provided for the control signals G1 and G2. In the dead time Td, both the control signals G1 and G2 may be at a low level. Similarly, the control signals G3 and G4 may be so controlled that either the control signal G3 or the control signal G4 is at a high level. In this case, the dead time Td may be provided for the control signals G3 and G4. In this example, the control circuit 40 may change the control signal G2 from the low level to the high level at a timing t13, may change the control signal G2 from the high level to the low level at a timing t14, may change the control signal G1 from the low level to the high level at a timing t15, and may change the control signal G1 from the high level to the low level at a timing t18 (parts (A) and (B) of FIG. 5). Similarly, the control circuit 40 may change the control signal G3 from a low level to the high level at the timing t13, may change the control signal G3 from the high level to the low level at the timing t14, may change the control signal G4 from a low level to the high level at the timing t15, and may change the control signal G4 from the high level to the low level at the timing t18 (parts (C) and (D) of FIG. 5). The control circuit 40 may repeat such an operation with a switching period T. The electric power conversion apparatus 10 may perform the switching operation, based on the above-described control signals G1 to G4 to thereby perform the electric power conversion operation of converting electric power supplied from the high voltage battery BH and supplying the converted electric power to the low voltage battery BL. In addition, the electric power conversion apparatus 10 may so control respective duty ratios of the control signals G1 to G4 as to cause the voltage VL to remain at the predetermined voltage.

The electric power regeneration circuit 30 may operate to allow the energy of the surge voltage that occurs in the transistor Q3 to be regenerated. The energy of the surge voltage that occurs in the transistor Q3 may be supplied to the capacitor 33 of the electric power regeneration circuit 30 via the diode 31, and may be temporarily stored in the capacitor 33. The control circuit 40 may generate the control signals G5 and G6, based on the voltage VSNB of the capacitor 33. The electric power regeneration circuit 30 may thus allow the energy of the surge voltage that occurs in the transistor Q3 to be regenerated.

For example, when the control circuit 40 changes the control signal G3 from the high level to the low level at a timing t11 (part (C) of FIG. 5), a current may flow into the body diode of the transistor Q3 in this example. Thereafter, the body diode of the transistor Q3 may switch from on to off by a reverse recovery operation of the body diode. This may cause the drain-to-source voltage VdsQ3 of the transistor Q3 to increase from 0 V (part (E) of FIG. 5). The drain-to-source voltage VdsQ3 may transiently exceed the voltage VSNB of the capacitor 33 at a timing t12. In a period in which the drain-to-source voltage VdsQ3 exceeds the voltage VSNB, the diode 31 may be turned on, and a current may flow into the capacitor 33 via the diode 31. The capacitor 33 may thus be charged transiently, and the voltage VSNB of the capacitor 33 may increase (part (G) of FIG. 5). In this example, the increased voltage VSNB may be lower than the threshold voltage VthH. Thereafter, the drain-to-source voltage VdsQ3 of the transistor Q3 may decrease to 0 V in a period from a timing at which the control signal G1 changes from the high level to the low level to a timing at which the control signal G3 changes from the low level to the high level (part (E) of FIG. 5). Thereafter, at the timing t13, the control circuit 40 may change the control signal G3 from the low level to the high level (part (C) of FIG. 5), which may cause the transistor Q3 to switch from off to on.

Similarly, when the control circuit 40 changes the control signal G3 from the high level to the low level at the timing t14 (part (C) of FIG. 5), a current may flow into the body diode of the transistor Q3. Thereafter, the body diode of the transistor Q3 may switch from on to off by the reverse recovery operation of the body diode. This may cause the drain-to-source voltage VdsQ3 of the transistor Q3 to increase from 0 V (part (E) of FIG. 5). At a timing t16, the drain-to-source voltage VdsQ3 may become transiently high and the diode 31 may be turned on. The capacitor 33 may thus be charged transiently, and the voltage VSNB of the capacitor 33 may increase (part (G) of FIG. 5). In this example, the increased voltage VSNB may exceed the threshold voltage VthH at a timing t17. The control circuit 40 may generate the control signals G5 and G6, based on this voltage VSNB.

At the timing t17 at which the voltage VSNB exceeds the threshold voltage VthH, the comparator 43 may change the signal CMP from a low level to a high level (part (H) of FIG. 5). The pulse signal generation circuit 44 may generate the pulse signal PLS synchronized with the control signals G1 and G2 (part (I) of FIG. 5). In this example, a timing of a rise of the pulse signal PLS may be substantially the same as a timing of a rise of the control signal G2. The AND circuit 45 may calculate the AND of the signal CMP and the pulse signal PLS (parts (H) and (I) of FIG. 5). In each of parts (H) and (I) of FIG. 5, a shaded period may be a period in which both the signal CMP and the pulse signal PLS are at the high level. The control signal generation circuit 46 may generate the control signals G5 and G6, based on the output signal from the AND circuit 45 (parts (J) and (K) of FIG. 5). The control signals G5 and G6 may be so controlled that either the control signal G5 or the control signal G6 is at a high level. In this case, the dead time Td may be provided for the control signals G5 and G6.

At a timing t19, the control signal generation circuit 46 may change the control signal G6 from the high level to a low level (part (K) of FIG. 5). This may cause the transistor Q6 to switch from on to off. Further, at a timing t20 at which the dead time Td has elapsed from the timing t19, the control signal generation circuit 46 may change the control signal G5 from a low level to the high level (part (J) of FIG. 5). This may cause the transistor Q5 to switch from off to on, and the regenerative current IL may flow from the capacitor 33 toward the capacitor 20 via the transistor Q5, the inductor 35, and the diode 36 (part (L) of FIG. 5). In other words, the energy of the surge voltage that occurs in the transistor Q3 may be temporarily stored in the capacitor 33 of the electric power regeneration circuit 30, and may be thereafter regenerated in the capacitor 20. In a period from the timing t20 to a timing t21, the regenerative current IL may increase. Because the capacitor 33 is discharged, the voltage VSNB of the capacitor 33 may decrease toward the threshold voltage VthL (part (G) of FIG. 5).

At the timing t21, when the voltage VSNB reaches the threshold voltage VthL, the comparator 43 may change the signal CMP from the high level to the low level (part (H) of FIG. 5). In response thereto, the control signal generation circuit 46 may change the control signal G5 from the high level to the low level (part (J) of FIG. 5). This may cause the transistor Q5 to switch from on to off. Because the discharging of the capacitor 33 is stopped, the voltage VSNB may remain at substantially the same voltage as the threshold voltage VthL (part (G) of FIG. 5). Further, at a timing t22 at which the dead time Td has elapsed from the timing t21, the control signal generation circuit 46 may change the control signal G6 from the low level to the high level (part (K) of FIG. 5). This may cause the transistor Q6 to switch from off to on. In a period from the timing t21 to a timing t23, the regenerative current IL may decrease ((L) of FIG. 5).

The electric power regeneration circuit 30 may thus allow the energy of the surge voltage that occurs in the transistor Q3 to be regenerated.

Figure 6:
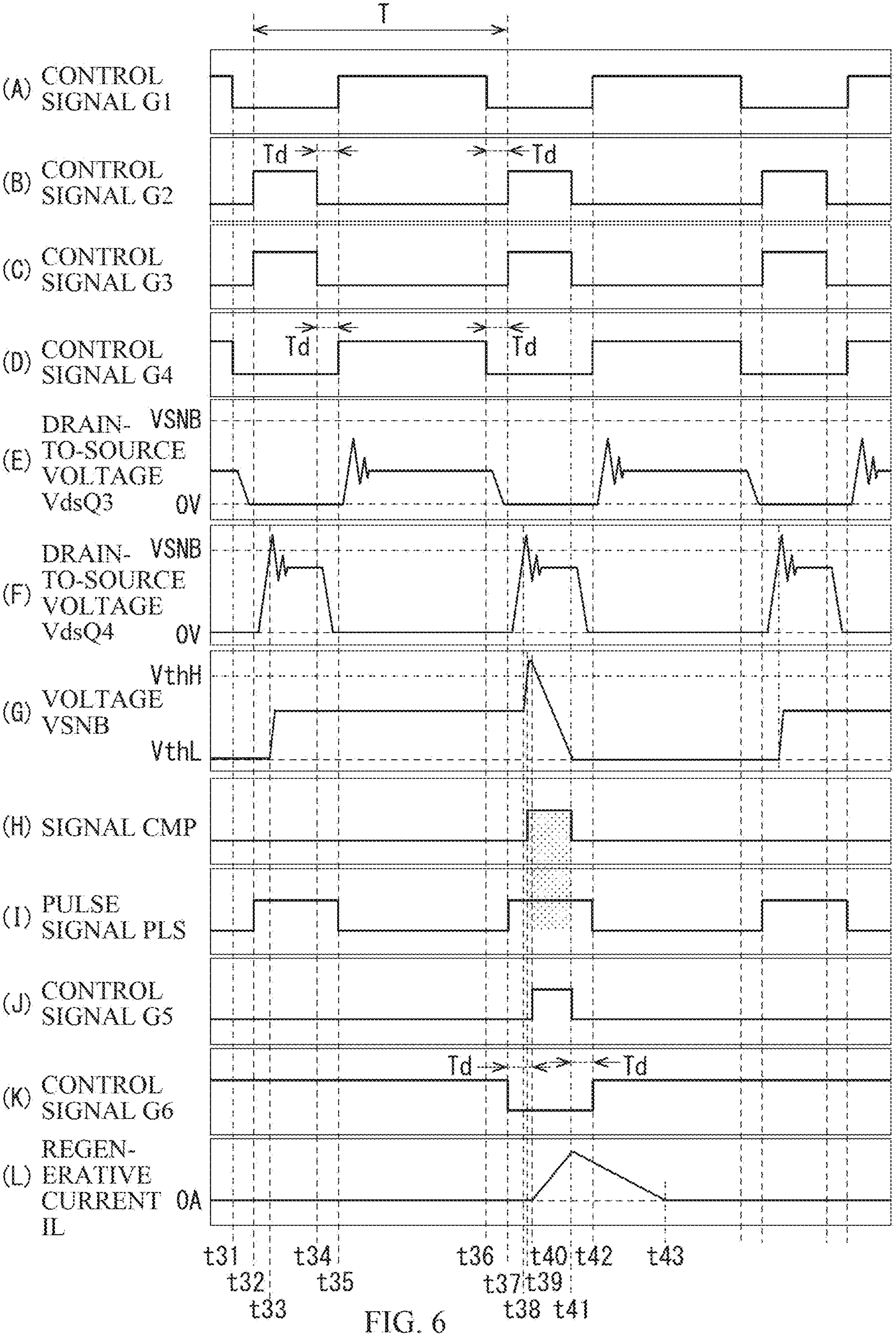
FIG. 6 is a timing waveform diagram illustrating another operation example of the electric power conversion system illustrated in FIG. 1.

FIG. 6 illustrates an operation example of the electric power conversion system 1 when the voltage VH is the upper-limit voltage (e.g., 300 V) of the normal operation voltage range.

As with the case illustrated in FIG. 5, the control circuit 40 may generate the control signals G1 to G4, based on the voltage VL (parts (A) to (D) of FIG. 6). In this example, the control circuit 40 may change the control signal G2 from the low level to the high level at a timing t32, may change the control signal G2 from the high level to the low level at a timing t34, may change the control signal G1 from the low level to the high level at a timing t35, and may change the control signal G1 from the high level to the low level at a timing t36 (parts (A) and (B) of FIG. 6). Similarly, the control circuit 40 may change the control signal G3 from the low level to the high level at the timing t32, may change the control signal G3 from the high level to the low level at the timing t34, may change the control signal G4 from the low level to the high level at the timing t35, and may change the control signal G4 from the high level to the low level at the timing t36 (parts (C) and (D) of FIG. 6). The control circuit 40 may repeat such an operation with the switching period T. The electric power conversion apparatus 10 may perform the switching operation, based on the above-described control signals G1 to G4 to thereby perform the electric power conversion operation of converting electric power supplied from the high voltage battery BH and supplying the converted electric power to the low voltage battery BL. In addition, the electric power conversion apparatus 10 may so control the respective duty ratios of the control signals G1 to G4 as to cause the voltage VL to remain at the predetermined voltage.

The electric power regeneration circuit 30 may operate to allow the energy of the surge voltage that occurs in the transistor Q4 to be regenerated. The energy of the surge voltage that occurs in the transistor Q4 may be supplied to the capacitor 33 of the electric power regeneration circuit 30 via the diode 32, and may be temporarily stored in the capacitor 33. The control circuit 40 may generate the control signals G5 and G6, based on the voltage VSNB of the capacitor 33. The electric power regeneration circuit 30 may thus allow the energy of the surge voltage that occurs in the transistor Q4 to be regenerated.

For example, when the control circuit 40 changes the control signal G4 from the high level to the low level at a timing t31 (part (D) of FIG. 6), a current may flow into the body diode of the transistor Q4 in this example. Thereafter, the body diode of the transistor Q4 may switch from on to off by a reverse recovery operation of the body diode. This may cause the drain-to-source voltage VdsQ4 of the transistor Q4 to increase from 0 V (part (F) of FIG. 6). The drain-to-source voltage VdsQ4 may transiently exceed the voltage VSNB of the capacitor 33 at a timing t33. In a period in which the drain-to-source voltage VdsQ4 exceeds the voltage VSNB, the diode 32 may be turned on, and a current may flow into the capacitor 33 via the diode 32. The capacitor 33 may thus be charged transiently, and the voltage VSNB of the capacitor 33 may increase (part (G) of FIG. 6). In this example, the increased voltage VSNB may be lower than the threshold voltage VthH. Thereafter, the drain-to-source voltage VdsQ4 of the transistor Q4 may decrease to 0 V in a period from a timing at which the control signal G2 changes from the high level to the low level to a timing at which the control signal G4 changes from the low level to the high level (part (F) of FIG. 6). Thereafter, at the timing t35, the control circuit 40 may change the control signal G4 from the low level to the high level (part (D) of FIG. 6), which may cause the transistor Q4 to switch from off to on.

Similarly, when the control circuit 40 changes the control signal G4 from the high level to the low level at the timing t36 (part (D) of FIG. 6), a current may flow into the body diode of the transistor Q4. Thereafter, the body diode of the transistor Q4 may switch from on to off by the reverse recovery operation of the body diode. This may cause the drain-to-source voltage VdsQ4 of the transistor Q4 to increase from 0 V (part (F) of FIG. 6). At a timing t38, the drain-to-source voltage VdsQ4 may become transiently high and the diode 32 may be turned on. The capacitor 33 may thus be charged transiently, and the voltage VSNB of the capacitor 33 may increase (part (G) of FIG. 6). In this example, the increased voltage VSNB may exceed the threshold voltage VthH at a timing t39.

At the timing t39 at which the voltage VSNB exceeds the threshold voltage VthH, the comparator 43 may change the signal CMP from the low level to the high level (part (H) of FIG. 6). The AND circuit 45 may calculate the AND of the signal CMP and the pulse signal PLS (parts (H) and (I) of FIG. 6). In each of parts (H) and (I) of FIG. 6, a shaded period may be a period in which both the signal CMP and the pulse signal PLS are at the high level. The control signal generation circuit 46 may generate the control signals G5 and G6, based on the output signal from the AND circuit 45 (parts (J) and (K) of FIG. 6).

At a timing t37, the control signal generation circuit 46 may change the control signal G6 from the high level to the low level (part (K) of FIG. 6). This may cause the transistor Q6 to switch from on to off. Further, at a timing t40 at which the dead time Td has elapsed from the timing t37, the control signal generation circuit 46 may change the control signal G5 from the low level to the high level (part (J) of FIG. 6). This may cause the transistor Q5 to switch from off to on, and the regenerative current IL may flow from the capacitor 33 toward the capacitor 20 via the transistor Q5, the inductor 35, and the diode 36 (part (L) of FIG. 6). In other words, the energy of the surge voltage that occurs in the transistor Q3 may be temporarily stored in the capacitor 33 of the electric power regeneration circuit 30, and may be thereafter regenerated in the capacitor 20. In a period from the timing t40 to a timing t41, the regenerative current IL may increase. Because the capacitor 33 is discharged, the voltage VSNB of the capacitor 33 may decrease toward the threshold voltage VthL (part (G) of FIG. 6).

At the timing t41, when the voltage VSNB reaches the threshold voltage VthL, the comparator 43 may change the signal CMP from the high level to the low level (part (H) of FIG. 6). In response thereto, the control signal generation circuit 46 may change the control signal G5 from the high level to the low level (part (J) of FIG. 6). This may cause the transistor Q5 to switch from on to off. Because the discharging of the capacitor 33 is stopped, the voltage VSNB may remain at substantially the same voltage as the threshold voltage VthL (part (G) of FIG. 6). Further, at a timing t42 at which the dead time Td has elapsed from the timing t41, the control signal generation circuit 46 may change the control signal G6 from the low level to the high level (part (K) of FIG. 6). This may cause the transistor Q6 to switch from off to on. In a period from the timing t41 to a timing t43, the regenerative current IL may decrease (part (L) of FIG. 6).

The electric power regeneration circuit 30 may thus allow the energy of the surge voltage that occurs in the transistor Q4 to be regenerated.

As described above, when the voltage VH is a low voltage within the normal operation voltage range, the electric power regeneration circuit 30 may allow the energy of the surge voltage that occurs in the transistor Q3 to be regenerated, as illustrated in FIG. 5. When the voltage VH is a high voltage within the normal operation voltage range, the electric power regeneration circuit 30 may allow the energy of the surge voltage that occurs in the transistor Q4 to be regenerated, as illustrated in FIG. 6.

Next, a description will be given of an operation of the electric power conversion system 1 when the voltage VH is higher than the normal operation voltage range.

Figure 7:
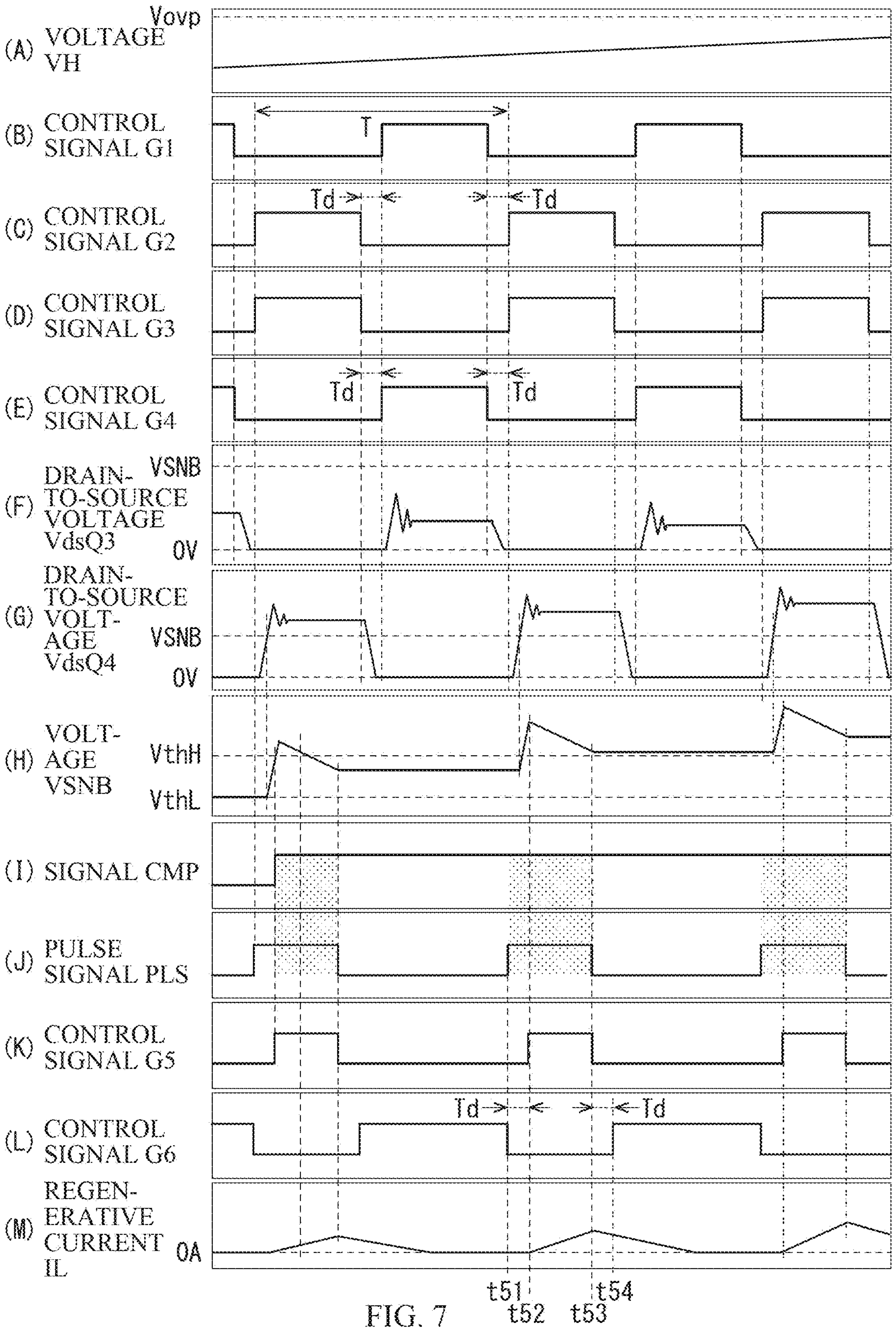
FIG. 7 is a timing waveform diagram illustrating still another operation example of the electric power conversion system illustrated in FIG. 1.

FIG. 7 illustrates an operation example of the electric power conversion system 1 when the voltage VH is higher than the normal operation voltage range and lower than the maximum voltage Vovp. Part (A) of FIG. 7 illustrates a waveform of the voltage VH. Parts (B) to (E) of FIG. 7 respectively illustrate the waveforms of the control signals G1 to G4. Part (F) of FIG. 7 illustrates the waveform of the drain-to-source voltage VdsQ3 of the transistor Q3. Part (G) of FIG. 7 illustrates the waveform of the drain-to-source voltage VdsQ4 of the transistor Q4. Part (H) of FIG. 7 illustrates the waveform of the voltage VSNB of the capacitor 33 of the electric power regeneration circuit 30. Part (I) of FIG. 7 illustrates the waveform of the signal CMP. Part (J) of FIG. 7 illustrates the waveform of the pulse signal PLS. Parts (K) and (L) of FIG. 7 respectively illustrate the waveforms of the control signals G5 and G6. Part (M) of FIG. 7 illustrates the waveform of the regenerative current IL flowing through the inductor 35 of the electric power regeneration circuit 30.

In this example, the voltage VH may be represented by the following expression.

$$VthH \times Np/Ns < VH \leq Vovp$$

where:

Np represents the number of turns of the winding 16A; and

Ns represents the number of turns of the winding 16B.

In other words, "VthH×Np/Ns" may be a voltage in which the threshold voltage VthH is converted based on a voltage at each of the terminals T11 and T12.

As illustrated in part (A) of FIG. 7, in this example, the voltage VH may increase toward the maximum voltage Vovp. As with in the cases illustrated in FIGS. 5 and 6, the control circuit 40 may generate the control signals G1 to G4, based on the voltage VL (parts (B) to (E) of FIG. 7).

In this example, because the voltage VH gradually increases, the voltage across the winding 16B of the transformer 16 may also gradually increase. Accordingly, the drain-to-source voltage VdsQ4 of the transistor Q4 may gradually increase in a period in which the transistor Q4 is off, and may exceed the voltage VSNB of the capacitor 33 (part (G) of FIG. 7). When the drain-to-source voltage VdsQ4 exceeds the voltage VSNB, the diode 32 may be turned on, the capacitor 33 may be charged, and the voltage VSNB may increase (part (H) of FIG. 7). In this example, except during an initial period in FIG. 7, the voltage VSNB may be higher than the threshold voltage VthH, and the comparator 43 may thus maintain the signal CMP at the high level (part (I) of FIG. 7). The AND circuit 45 may calculate the AND of the signal CMP and the pulse signal PLS (parts (I) and (J) of FIG. 7). Because the signal CMP is maintained at the high level, the output signal from the AND circuit 45 may have a waveform substantially the same as that of the pulse signal PLS. The control signal generation circuit 46 may generate the control signals G5 and G6, based on the output signal from the AND circuit 45 (parts (K) and (L) of FIG. 7). For example, the control signal generation circuit 46 may change the control signal G6 from the high level to the low level at a timing t51, and may change the control signal G5 from the low level to the high level at a timing t52 at which the dead time Td has elapsed from the timing t51. Further, the control signal generation circuit 46 may change the control signal G5 from the high level to the low level at a timing t53, and may change the control signal G6 from the low level to the high level at a timing t54 at which the dead time Td has elapsed from the timing t53. The transistors Q5 and Q6 may respectively operate based on the control signals G5 and G6. The regenerative current IL may increase in a period in which the control signal G5 is at the high level, and may thereafter decrease (part (M) of FIG. 7).

In the electric power conversion system 1, the pulse signal generation circuit 44 and the AND circuit 45 may be provided, the AND of the signal CMP and the pulse signal PLS may be calculated, and the control signals G5 and G6 may be generated based on the output signal from the AND circuit 45. With such a configuration, the electric power regeneration circuit 30 may allow the electric power to be regenerated while limiting a maximum time in which the transistor Q5 is on, in accordance with the pulse signal PLS, as illustrated in parts (I) to (M) of FIG. 7, even when the signal CMP remains at the high level as in the example illustrated in FIG. 7. This helps to limit the regenerative electric power and to suppress an increase in the regenerative electric power in the electric power conversion system 1, which in turn helps to make it possible for the electric power conversion system 1 to protect the electric power regeneration circuit 30.

For example, if neither the pulse signal generation circuit 44 nor the AND circuit 45 is provided, the control signal G5 can remain at the high level, which can lead to a possibility that the regenerative electric power becomes excessively large. In such a case, the electric power regeneration circuit 30 can be damaged. The electric power conversion system 1 may be provided with the pulse signal generation circuit 44 and the AND circuit 45, which helps to suppress an increase in the regenerative electric power. This helps to make it possible for the electric power conversion system 1 to protect the electric power regeneration circuit 30.

One possible approach to protecting the electric power regeneration circuit 30 may be, for example, to include, in the electric power regeneration circuit 30, components that withstand a large amount of electric power. However, this involves a larger component size, and leads to an increase in cost accordingly. In contrast, in the electric power conversion system 1, the use of the pulse signal PLS helps to make it unnecessary to increase the size of the components, and therefore to prevent an increase in cost. This helps to make it possible for the electric power conversion system 1 to effectively protect the electric power regeneration circuit 30.

As described above, in the electric power conversion system 1, the threshold voltages VthH and VthL may each be set to be higher than each of the voltage, at the drain of the transistor Q3, corresponding to the voltage VP and the voltage, at the drain of the transistor Q4, corresponding to the voltage VM, when the voltage VH is within the normal operation voltage range. In addition, in the electric power conversion system 1, the AND of the signal CMP and the pulse signal PLS may be calculated, and the control signals G5 and G6 may be generated based on the output signal from the AND circuit 45. This helps to make it possible for the electric power conversion system 1 to protect the electric power regeneration circuit 30 when the voltage VH sharply changes to a voltage higher than the normal operation voltage range (e.g. from 300 V to 400 V both inclusive).

Figure 8:
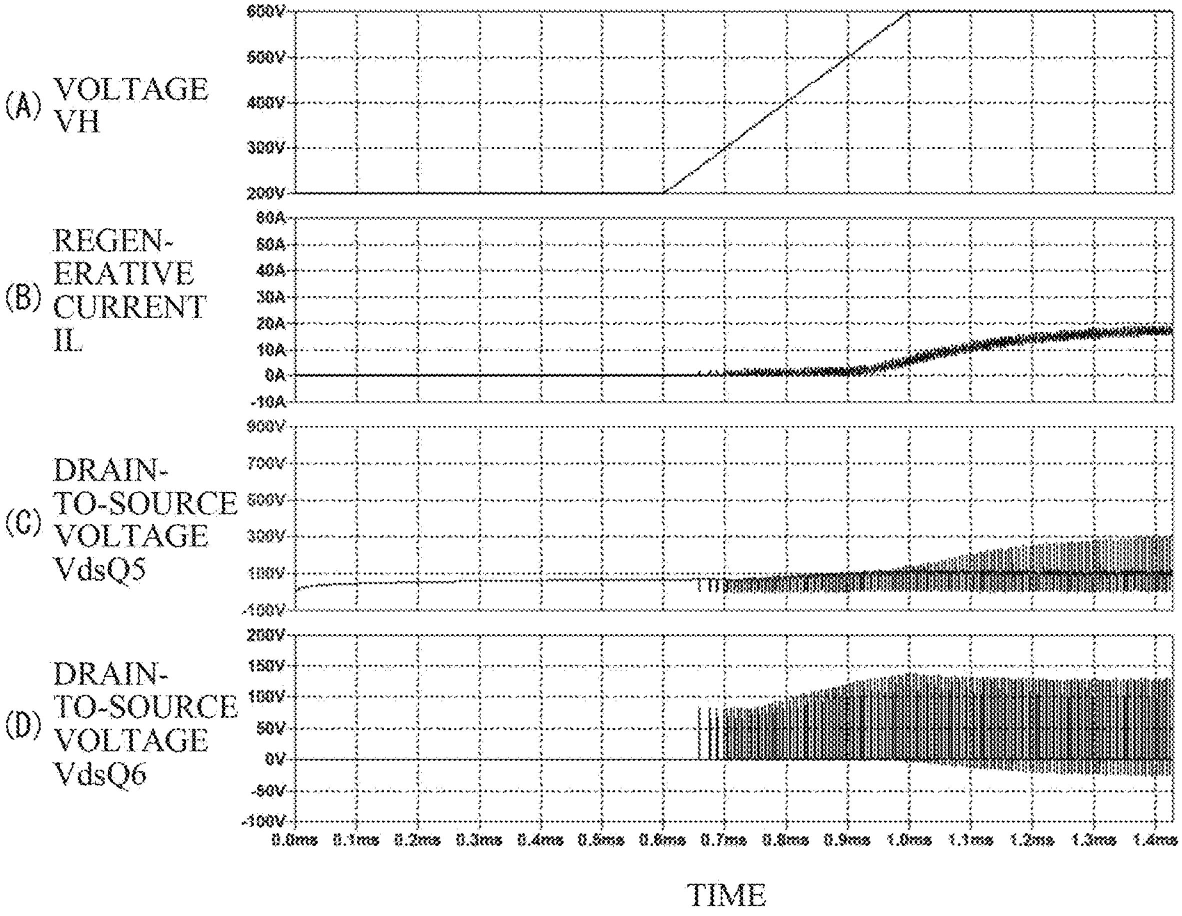
FIG. 8 is a waveform diagram illustrating an operation example where an input voltage sharply changes, in the electric power conversion system illustrated in FIG. 1.
Figure 9:
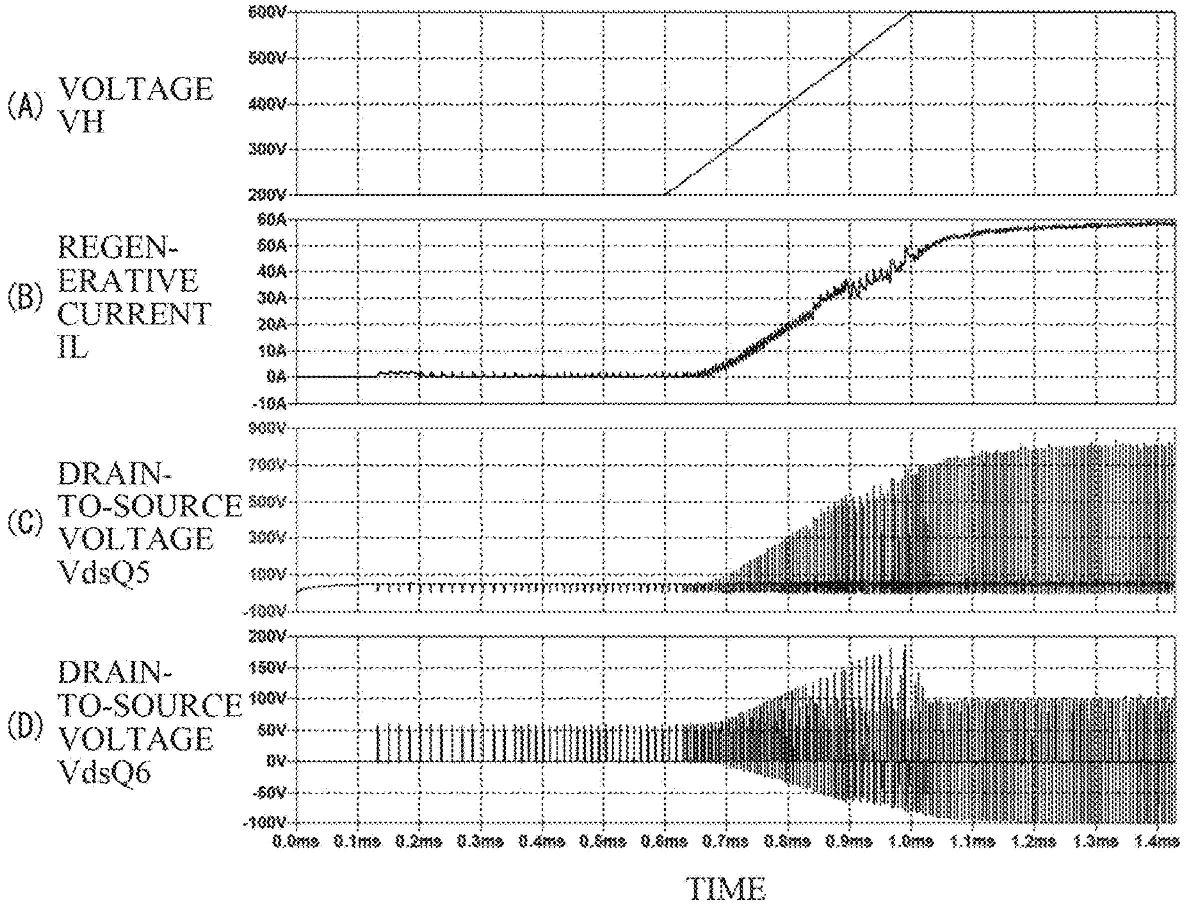
FIG. 9 is a waveform diagram illustrating an operation example where an input voltage sharply changes, in an electric power conversion system according to a reference example.

FIG. 8 illustrates an example of a simulation result of the electric power conversion system 1 in a case where the voltage VH is sharply changed. Part (A) of FIG. 8 illustrates the waveform of the voltage VH at the capacitor 11. Part (B) of FIG. 8 illustrates the waveform of the regenerative current IL of the inductor 35 of the electric power regeneration circuit 30. Part (C) of FIG. 8 illustrates a waveform of a drain-to-source voltage VdsQ5 of the transistor Q5. Part (D) of FIG. 8 illustrates a waveform of a drain-to-source voltage VdsQ6 of the transistor Q6. FIG. 9 illustrates an example of a simulation result of an electric power conversion system according to a reference example. In the electric power conversion system according to the reference example, neither of the two techniques described above is employed.

In this example, the voltage VH may be changed gradually from 200 V to 600 V over a time period of 0.4 msec. Further, in this example, the operation of the electric power conversion apparatus 10 may not be stopped even if the voltage VH exceeds the maximum voltage Vovp (400 V).

When the voltage VH increases, the voltage across the winding 16B of the transformer 16 may increase, and a larger amount of electric power may be regenerated accordingly. Therefore, as illustrated in FIG. 8, when the voltage VH increases, the regenerative current IL may increase, and the drain-to-source voltage VdsQ5 of the transistor Q5 and the drain-to-source voltage VdsQ6 of the transistor Q6 may increase.

In the electric power conversion system according to the reference example, as illustrated in FIG. 9, the regenerative current IL starts to increase at a timing at which the voltage VH reaches about 250 V. In contrast, in the electric power conversion system 1 according to the present example embodiment, as illustrated in FIG. 8, the regenerative current IL may start to increase at a timing at which the voltage VH reaches about 500 V. In the electric power conversion system 1, the threshold voltages VthH and VthL may each be set to be higher than each of the voltage, at the drain of the transistor Q3, corresponding to the voltage VP and the voltage, at the drain of the transistor Q4, corresponding to the voltage VM, when the voltage VH is within the normal operation voltage range. This helps to make it possible for the electric power conversion system 1 to delay a timing at which the regenerative current IL starts to increase in the case where the voltage VH is sharply changed.

Further, in the electric power conversion system according to the reference example, as illustrated in FIG. 9, the regenerative current IL when the voltage VH is 600 V is about 60 A. In contrast, in the electric power conversion system 1 according to the present example embodiment, as illustrated in FIG. 8, the regenerative current IL when the voltage VH is 600 V may be about 20 A. In the electric power conversion system 1, the AND of the signal CMP and the pulse signal PLS may be calculated, and the control signals G5 and G6 may be generated based on the output signal from the AND circuit 45. With such a configuration, the electric power conversion system 1 may allow the electric power to be regenerated intermittently in accordance with the pulse signal PLS. This helps to make it possible for the electric power conversion system 1 to suppress the regenerative current IL.

As described above, in the electric power conversion system 1, the regenerative electric power is suppressed when the voltage VH sharply changes. This helps to decrease the drain-to-source voltage VdsQ5 of the transistor Q5 and the drain-to-source voltage VdsQ6 of the transistor Q6. This helps to make it possible for the electric power conversion system 1 to protect the electric power regeneration circuit 30 when the voltage VH sharply changes.

[Regarding Noise Whine]

In a case where the inductor operates in a human audible frequency range, a noise sound due to what is called a noise whine can occur. The inductor 35 of the electric power regeneration circuit 30 may operate in the audible frequency range.

Figure 10:
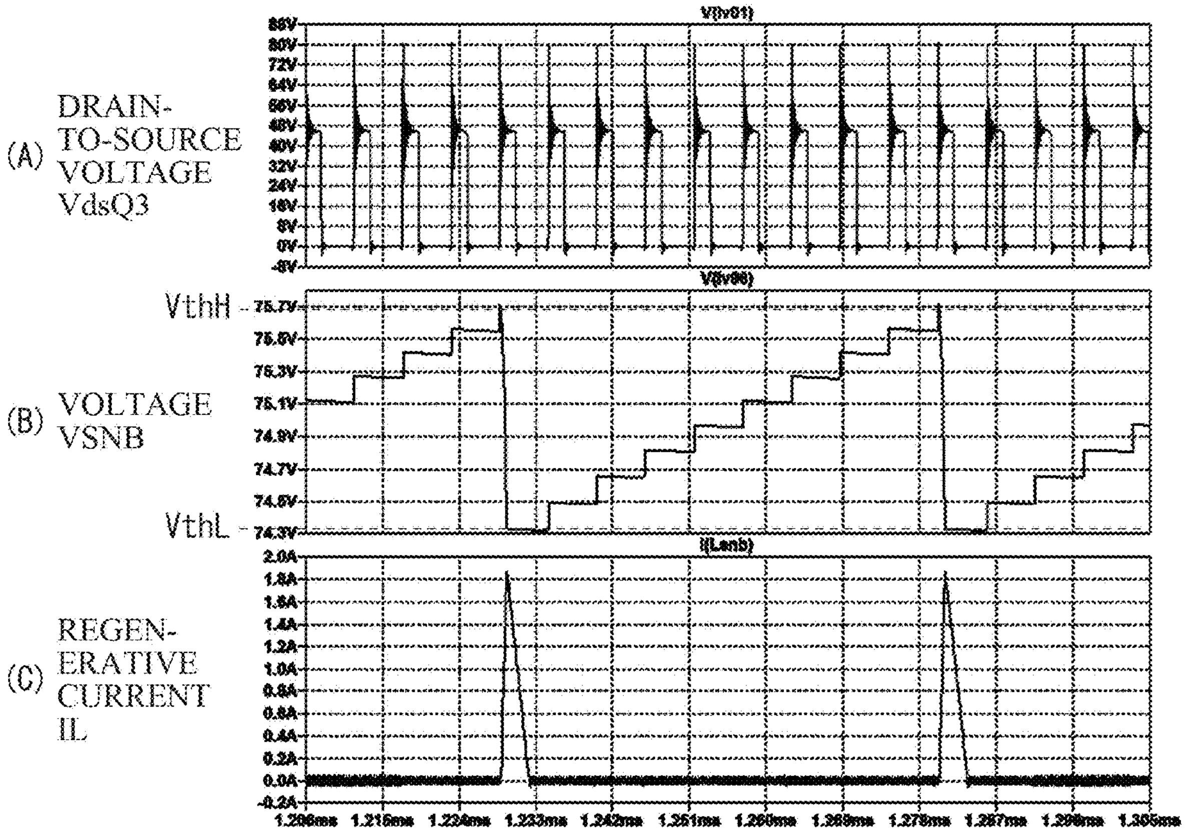
FIG. 10 is a waveform diagram illustrating an operation example of the electric power conversion system illustrated in FIG. 1.

FIG. 10 illustrates an operation example of the electric power regeneration circuit 30. Part (A) of FIG. 10 illustrates the waveform of the drain-to-source voltage VdsQ3 of the transistor Q3 in the rectifying circuit 17. Part (B) of FIG. 10 illustrates the waveform of the voltage VSNB of the capacitor 33 in the electric power regeneration circuit 30. Part (C) of FIG. 10 illustrates the waveform of the regenerative current IL flowing through the inductor 35.

Each time the surge voltage occurs due to the switching operation of the transistor Q3, as illustrated in part (A) of FIG. 10, the diode 31 may be turned on transiently, and the capacitor 33 may be charged. As a result, the voltage VSNB of the capacitor 33 may increase in a stepwise manner. When the voltage VSNB reaches the threshold voltage VthH, the transistor Q5 may be turned on and the transistor Q6 may be turned off, the capacitor 33 may be discharged, and the regenerative current IL may flow. When the voltage VSNB reaches the threshold voltage VthL, the transistor Q5 may be turned off and the transistor Q6 may be turned on. The electric power regeneration circuit 30 may repeat such an operation. In this example, a switching frequency may be 150 kHz. Accordingly, a frequency of the regenerative current IL may be about 16.6 kHz. The frequency of about 16.6 kHz may be within the human audible frequency range.

In the electric power conversion system 1, for example, the inductor 35 of the integrally molded metal type may be used. This helps to make it possible for the electric power conversion system 1 to suppress the noise sound due to the noise whine. For example, in a case where an inductor in which a winding wound around a bobbin is fit into a ferrite core is used, a mechanical vibration can result in occurrence of the noise sound due to the noise whine. In contrast, in the electric power conversion system 1, the inductor 35 of the integrally molded metal type may be used. The inductor of the integrally molded metal type may include a winding and a ferrite core that are integrally formed, which prevents a mechanical vibration from easily occurring. This helps to make it possible for the electric power conversion system 1 to suppress the noise sound due to the noise whine.

As described above, the electric power conversion system 1 includes the first electric power terminal (the terminals T11 and T12), the switching circuit 14, the transformer 16, the rectifying circuit 17, the smoothing circuit 18, the electric power regeneration circuit 30, the control circuit 40, and the second electric power terminal (the terminals T21 and T22). The switching circuit 14 is coupled to the first electric power terminal (the terminals T11 and T12). The transformer 16 includes the first winding (the winding 16A) and the second winding (the winding 16B). The first winding (the winding 16A) is led to the switching circuit 14. The rectifying circuit 17 is coupled to the second winding (the winding 16B) and includes one or more rectification switching devices. The smoothing circuit 18 includes the first inductor (the inductor 19) and the first capacitor (the capacitor 20). The first inductor (the inductor 19) has a first end and a second end. The first capacitor (the capacitor 20) has a first end coupled to the second end of the first inductor (the inductor 19), and a second end coupled to the reference node (the reference voltage line L22). The electric power regeneration circuit 30 is coupled to the rectifying circuit 17 and is configured to allow energy of a surge voltage that occurs in the rectifying circuit 17 to be regenerated in the first capacitor (the capacitor 20). The control circuit 40 is configured to control an operation of each of the switching circuit 14, the rectifying circuit 17, and the electric power regeneration circuit 30. The second electric power terminal (the terminals T21 and T22) includes a first coupling terminal (the terminal T21) and a second coupling terminal (the terminal T22). The first coupling terminal (the terminal T21) is coupled to the second end of the first inductor (the inductor 19) and the first end of the first capacitor (the capacitor 20). The second coupling terminal (the terminal T22) is coupled to the reference node (the reference voltage line L22). The electric power regeneration circuit 30 includes the diode circuit (the diodes 31 and 32), the second capacitor (the capacitor 33), the first regeneration switching device (the transistor Q5), the second regeneration switching device (the transistor Q6), the second inductor (the inductor 35), and the first diode (the diode 36). The diode circuit (the diodes 31 and 32) is provided on a path coupling the rectifying circuit 17 and the first node (the node N1) to each other. The diode circuit (the diodes 31 and 32) is configured to allow a current to flow toward the first node (the node N1). The second capacitor (the capacitor 33) has a first end coupled to the first node (the node N1), and a second end coupled to the reference node. The first regeneration switching device (the transistor Q5) has a first end coupled to the first node (the node N1), and a second end coupled to the second node (the node N2). The second regeneration switching device (the transistor Q6) has a first end coupled to the second node (the node N2), and a second end coupled to the reference node (the reference voltage line L22). The second inductor (the inductor 35) and the first diode (the diode 36) are provided on a path coupling the second node (the node N2) and the first end of the first capacitor (the capacitor 20) to each other. The control circuit 40 is configured to, when a voltage at the first node (the node N1) increases and exceeds the threshold voltage VthH, cause the first regeneration switching device (the transistor Q5) to switch from off to on and cause the second regeneration switching device (the transistor Q6) to switch from on to off. A first positive voltage (the voltage VP) and A first negative voltage (the voltage VM) are to alternately occur across the second winding, when an input voltage inputted to the first electric power terminal (the terminals T11 and T12) is within the normal operation voltage range. The threshold voltage VthH is higher than each of a voltage at the rectifying circuit 17 corresponding to an average value of the first positive voltage (the voltage VP) and a voltage at the rectifying circuit 17 corresponding to an average value of the first negative voltage (the voltage VM). This helps to allow the electric power conversion system 1 to delay the timing at which the regenerative current IL starts to increase in the case where the voltage VH is sharply changed, as illustrated in FIG. 8, and thus helps to make it possible for the electric power conversion system 1 to protect the electric power regeneration circuit 30.

In some embodiments, in the electric power conversion system 1, the second winding (the winding 16B) may have a first end coupled to the first end of the first inductor (the inductor 19), and a second end. The one or more rectification switching devices may include the first rectification switching device (the transistor Q3) and the second rectification switching device (the transistor Q4). The first rectification switching device (the transistor Q3) may have a first end coupled to the second end of the second winding (the winding 16B), and a second end coupled to the reference node (the reference voltage line L22). The second rectification switching device (the transistor Q4) may have a first end coupled to the first end of the second winding (the winding 16B), and a second end coupled to the reference node (the reference voltage line L22). The diode circuit may include the second diode (the diode 31) and the third diode (the diode 32). The second diode (the diode 31) may have an anode coupled to the first end of the first rectification switching device (the transistor Q3), and a cathode coupled to the first node (the node N1). The third diode (the diode 32) may have an anode coupled to the first end of the second rectification switching device (the transistor Q4), and a cathode coupled to the first node (the node N1). This helps to make it possible for the electric power regeneration circuit 30 in the electric power conversion system 1 to allow the energy of the surge voltage that occurs in each of the transistors Q3 and Q4 to be regenerated. This also helps to allow the electric power conversion system 1 to delay the timing at which the regenerative current IL starts to increase in the case where the voltage VH is sharply changed. This helps to make it possible for the electric power conversion system 1 to effectively protect the electric power regeneration circuit 30.

In some embodiments, in the electric power conversion system 1, the control circuit 40 may be configured to: generate a comparison result signal (the signal CMP) by comparing the voltage at the first node (the node N1) and the threshold voltage VthH with each other; generate the pulse signal PSL; calculate an AND of the comparison result signal (the signal CMP) and the pulse signal PLS; and control an operation of each of the first regeneration switching device (the transistor Q5) and the second regeneration switching device (the transistor Q6), based on a signal indicating the AND. In some embodiments, a length of a period during which the first regeneration switching device (the transistor Q5) is to be on may be shorter than a pulse width of the pulse signal PLS. In some embodiments, the pulse signal PLS may be synchronizable with a switching operation to be performed by the switching circuit. For example, the pulse width of the pulse signal PLS may be smaller than a maximum pulse width of the control signal G2 to be supplied to the transistor Q2. This helps to allow the electric power conversion system 1 to limit the length of the period during which the transistor Q5 is on with use of the pulse signal PLS, as illustrated in FIGS. 5 to 7. For example, this helps to allow the electric power conversion system 1 to suppress an increase in the regenerative current IL in the case where the voltage VH is sharply changed, as illustrated in FIG. 8. This helps to make it possible for the electric power conversion system 1 to protect the electric power regeneration circuit 30.

In some embodiments, in the electric power conversion system 1, the threshold voltage may include a first threshold voltage (the threshold voltage VthH) and a second threshold voltage (the threshold voltage VthL) that is lower than the first threshold voltage. The control circuit 40 may be configured to, in comparing the voltage at the first node (the node N1) and the threshold voltage with each other: when the voltage at the first node (the node N1) increases and exceeds the first threshold voltage (the threshold voltage VthH), cause the first regeneration switching device (the transistor Q5) to switch from off to on, and cause the second regeneration switching device (the transistor Q6) to switch from on to off; when the voltage at the first node (the node N1) decreases and falls below the second threshold voltage (the threshold voltage VthL), cause the first regeneration switching device (the transistor Q5) to switch from on to off, and cause the second regeneration switching device (the transistor Q6) to switch from off to on. This helps to allow the control circuit 40 to control the operations of the transistors Q5 and Q6 to achieve electric power regeneration, based on the voltage VSNB.

In some embodiments, in the electric power conversion system 1, the second inductor may include an integrally molded metal inductor. This helps to allow the electric power conversion system 1 to suppress the noise sound due to the noise whine.

Example Effects

As described above, according to the present example embodiment, provided are a first electric power terminal, a switching circuit, a transformer, a rectifying circuit, a smoothing circuit, an electric power regeneration circuit, a control circuit, and a second electric power terminal. The switching circuit is coupled to the first electric power terminal. The transformer includes a first winding and a second winding. The first winding is led to the switching circuit. The rectifying circuit is coupled to the second winding and includes one or more rectification switching devices. The smoothing circuit includes a first inductor and a first capacitor. The first inductor has a first end and a second end. The first capacitor has a first end coupled to the second end of the first inductor, and a second end coupled to a reference node. The electric power regeneration circuit is coupled to the rectifying circuit and is configured to allow energy of a surge voltage that occurs in the rectifying circuit to be regenerated in the first capacitor. The control circuit is configured to control an operation of each of the switching circuit, the rectifying circuit, and the electric power regeneration circuit. The second electric power terminal includes a first coupling terminal and a second coupling terminal. The first coupling terminal is coupled to the second end of the first inductor and the first end of the first capacitor. The second coupling terminal is coupled to the reference node. The electric power regeneration circuit includes a diode circuit, a second capacitor, a first regeneration switching device, a second regeneration switching device, a second inductor, and a first diode. The diode circuit is provided on a path coupling the rectifying circuit and a first node to each other. The diode circuit is configured to allow a current to flow toward the first node. The second capacitor has a first end coupled to the first node, and a second end coupled to the reference node. The first regeneration switching device has a first end coupled to the first node, and a second end coupled to a second node. The second regeneration switching device has a first end coupled to the second node, and a second end coupled to the reference node. The second inductor and the first diode are provided on a path coupling the second node and the first end of the first capacitor to each other. The control circuit is configured to, when a voltage at the first node increases and exceeds a threshold voltage, cause the first regeneration switching device to switch from off to on and cause the second regeneration switching device to switch from on to off. A first positive voltage and a first negative voltage are to alternately occur across the second winding, when an input voltage inputted to the first electric power terminal is within a normal operation voltage range. The threshold voltage is higher than each of a voltage at the rectifying circuit corresponding to an average value of the first positive voltage and a voltage at the rectifying circuit corresponding to an average value of the first negative voltage. This helps to protect the electric power regeneration circuit.

In some embodiments, the second winding may have a first end coupled to the first end of the first inductor, and a second end. The one or more rectification switching devices may include a first rectification switching device and a second rectification switching device. The first rectification switching device may have a first end coupled to the second end of the second winding, and a second end coupled to the reference node. The second rectification switching device may have a first end coupled to the first end of the second winding, and a second end coupled to the reference node. The diode circuit may include a second diode and a third diode. The second diode may have an anode coupled to the first end of the first rectification switching device, and a cathode coupled to the first node. The third diode may have an anode coupled to the first end of the second rectification switching device, and a cathode coupled to the first node. This helps to make it possible for the electric power conversion system 1 to effectively protect the electric power regeneration circuit.

In some embodiments, the control circuit may be configured to: generate a comparison result signal by comparing the voltage at the first node and the threshold voltage with each other; generate a pulse signal; calculate an AND of the comparison result signal and the pulse signal; and control an operation of each of the first regeneration switching device and the second regeneration switching device, based on a signal indicating the AND. In some embodiments, a length of a period during which the first regeneration switching device is to be on may be shorter than a pulse width of the pulse signal. In some embodiments, the pulse signal may be synchronizable with a switching operation to be performed by the switching circuit. This helps to protect the electric power regeneration circuit.

Modification Examples

In the foregoing example embodiment, the technique of one embodiment of the disclosure is applied to the electric power conversion system 1 having the circuit configuration illustrated in FIG. 1; however, this is non-limiting. The technique of one embodiment of the disclosure is applicable to an electric power conversion system having any of various circuit configurations.

Figure 11:
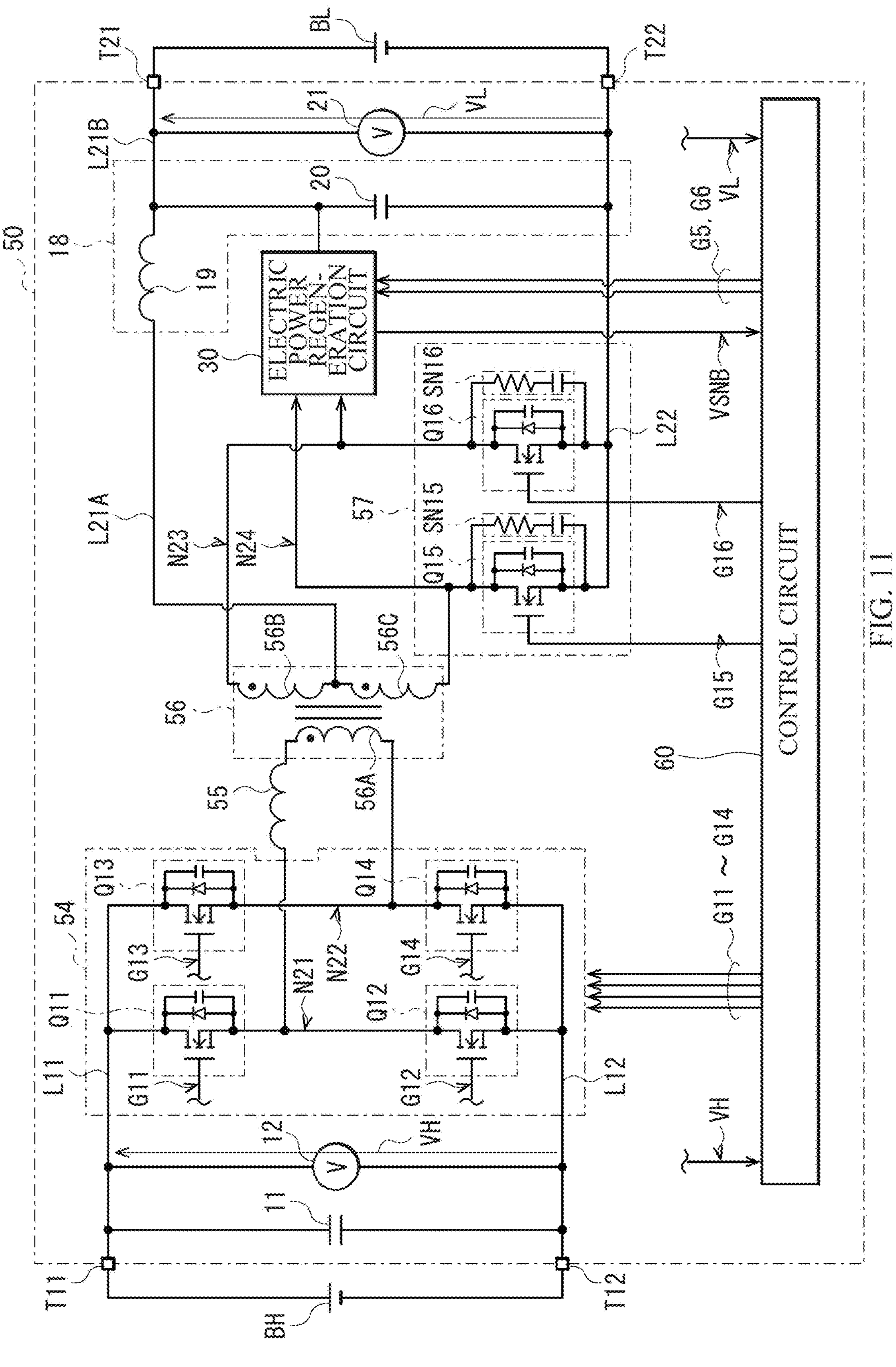
FIG. 11 is a circuit diagram illustrating a configuration example of an electric power conversion system according to a modification example.

FIG. 11 illustrates a configuration example of an electric power conversion system 2 according to a modification example. The electric power conversion system 2 may include an electric power conversion apparatus 50. The electric power conversion apparatus 50 may include the terminals T11 and T12, the capacitor 11, the voltage sensor 12, a switching circuit 54, an inductor 55, a transformer 56, a rectifying circuit 57, the smoothing circuit 18, the electric power regeneration circuit 30, the voltage sensor 21, a control circuit 60, and the terminals T21 and T22. Primary-side circuitry of the electric power conversion system 2 may include the high voltage battery BH, the capacitor 11, the voltage sensor 12, the switching circuit 54, and the inductor 55. Secondary-side circuitry of the electric power conversion system 2 may include the rectifying circuit 57, the smoothing circuit 18, the electric power regeneration circuit 30, the voltage sensor 21, and the low voltage battery BL.

The switching circuit 54 may include transistors Q11 to Q14. The transistor Q11 may have a drain coupled to the voltage line L11, a source coupled to a node N21, and a gate that receives a control signal G11. The transistor Q12 may have a drain coupled to the node N21, a source coupled to the reference voltage line L12, and a gate that receives a control signal G12. The transistor Q13 may have a drain coupled to the voltage line L11, a source coupled to a node N22, and a gate that receives a control signal G13. The transistor Q14 may have a drain coupled to the node N22, a source coupled to the reference voltage line L12, and a gate that receives a control signal G14.

The inductor 55 may have a first end coupled to the node N21, and a second end coupled to a winding 56A of the transformer 56. The winding 56A will be described later.

The transformer 56 may include the winding 56A, a winding 56B, and a winding 56C. The winding 56A may be a primary winding of the transformer 56. The winding 56A may have a first end coupled to the second end of the inductor 55, and a second end coupled to the node N22. The windings 56B and 56C may be secondary windings of the transformer 56. The winding 56B may have a first end coupled to a node N23, and a second end coupled to the voltage line L21A. The winding 56C may have a first end coupled to the voltage line L21A, and a second end coupled to a node N24.

The rectifying circuit 57 may include transistors Q15 and Q16 and snubber circuits SN15 and SN16. The transistor Q15 may have a drain coupled to the node N24, a source coupled to the reference voltage line L22, and a gate that receives a control signal G15. The transistor Q16 may have a drain coupled to the node N23, a source coupled to the reference voltage line L22, and a gate that receives a control signal G16. The snubber circuit SN15 may have a first end coupled to the drain of the transistor Q15, and a second end coupled to the source of the transistor Q15. The snubber circuit SN16 may have a first end coupled to the drain of the transistor Q16, and a second end coupled to the source of the transistor Q16.

Figure 12:
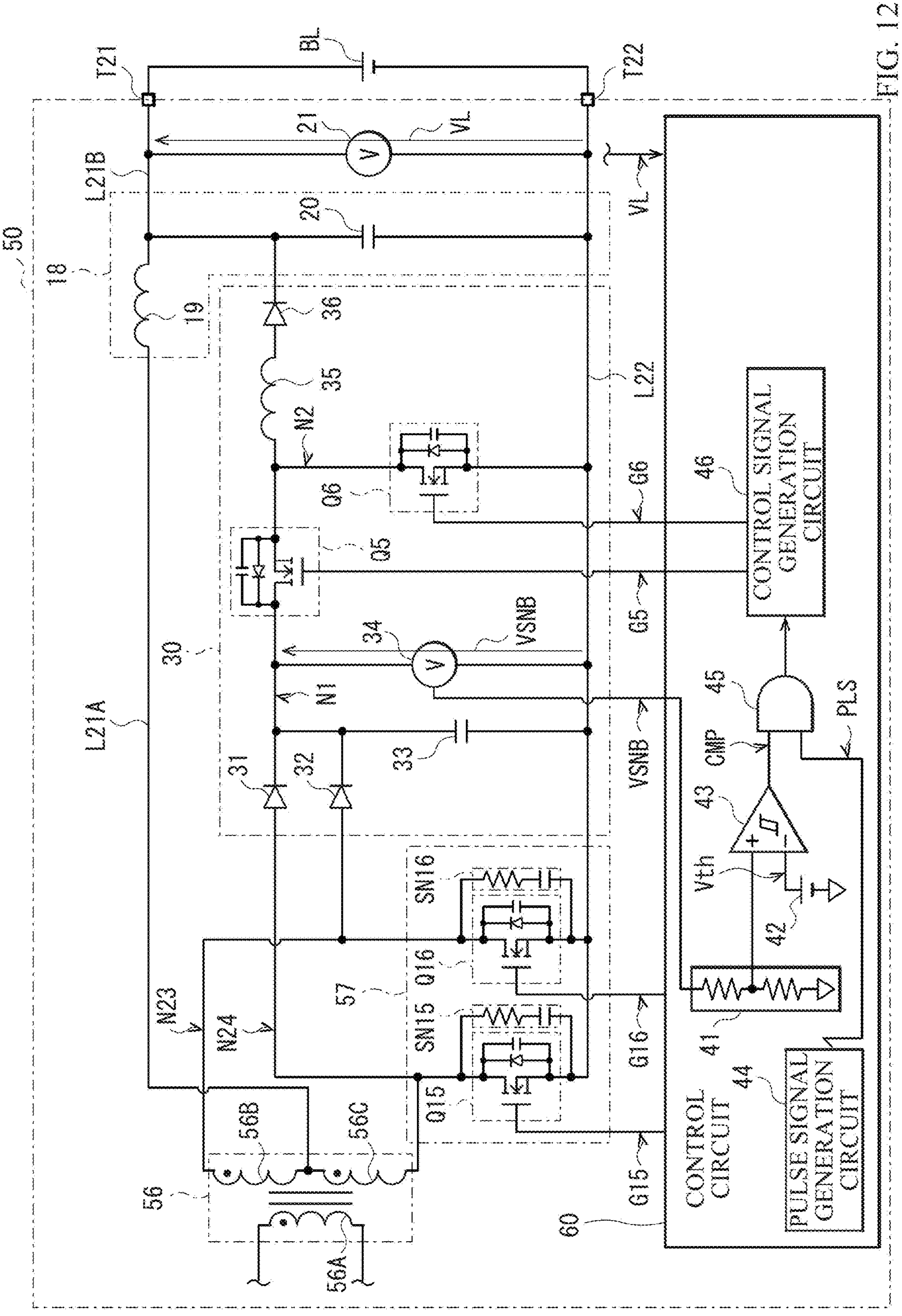
FIG. 12 is a circuit diagram illustrating a configuration example of an electric power regeneration circuit illustrated in FIG. 11.

FIG. 12 illustrates a configuration example of the electric power regeneration circuit 30. The anode of the diode 31 may be coupled to the node N24, and the anode of the diode 32 may be coupled to the node N23.

The control circuit 60 illustrated in FIG. 11 may be configured to control an operation of the electric power conversion apparatus 50, based on the voltage VH detected by the voltage sensor 12, the voltage VL detected by the voltage sensor 21, and the voltage VSNB detected by the voltage sensor 34 of the electric power regeneration circuit 30.

Figure 13:
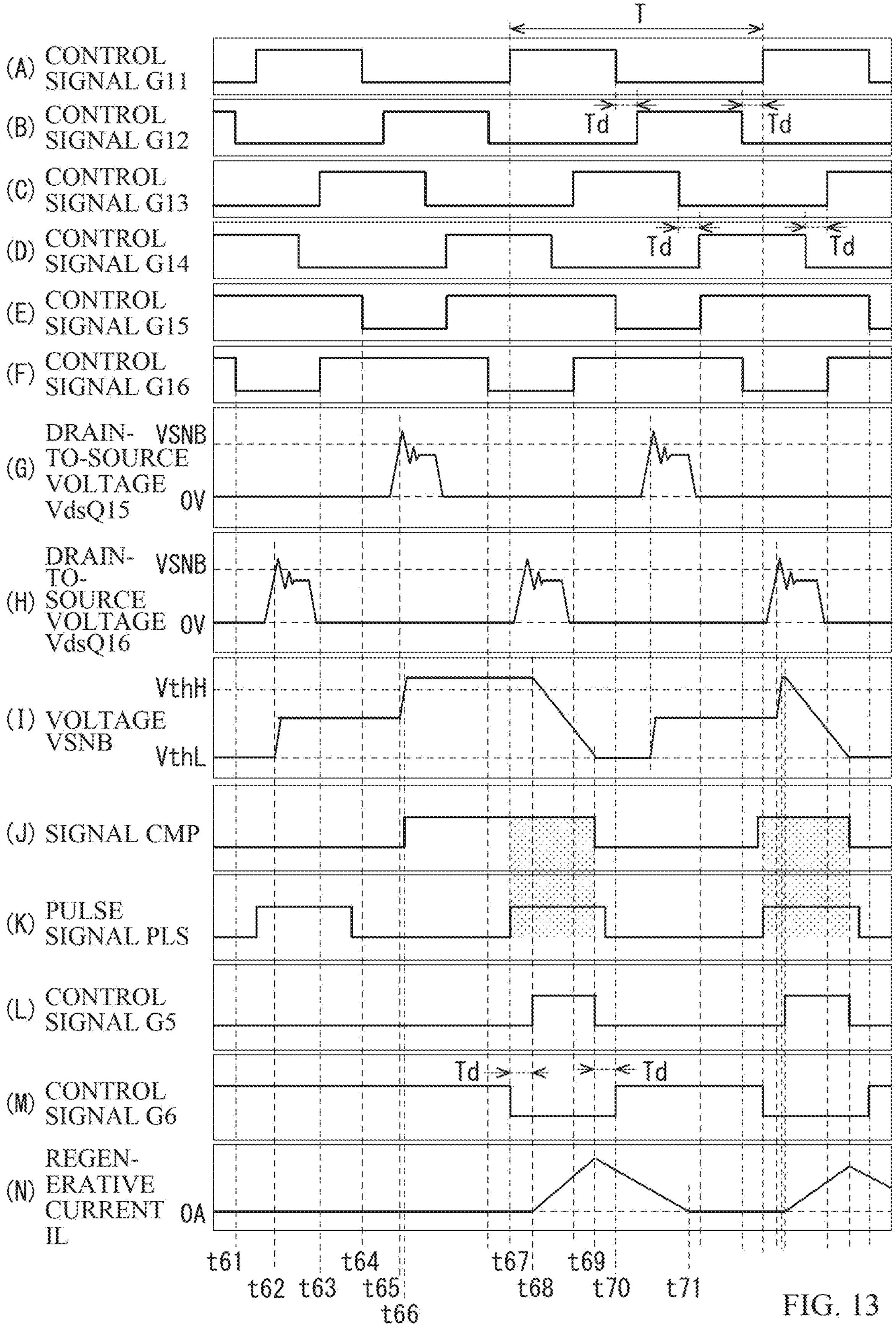
FIG. 13 is a timing waveform diagram illustrating an operation example of the electric power conversion system illustrated in FIG. 11.

FIG. 13 illustrates an operation example of the electric power conversion system 2 when the voltage VH is the upper-limit voltage (e.g., 300 V) of the normal operation voltage range. Parts (A) to (F) of FIG. 13 respectively illustrate waveforms of the control signals G11 to G16. Part (G) of FIG. 13 illustrates a waveform of a drain-to-source voltage VdsQ15 of the transistor Q15. Part (H) of FIG. 13 illustrates a waveform of a drain-to-source voltage VdsQ16 of the transistor Q16. Part (I) of FIG. 13 illustrates the waveform of the voltage VSNB of the capacitor 33 of the electric power regeneration circuit 30. Part (J) of FIG. 13 illustrates the waveform of the signal CMP. Part (K) of FIG. 13 illustrates the waveform of the pulse signal PLS. Parts (L) and (M) of FIG. 13 respectively illustrate the waveforms of the control signals G5 and G6. Part (N) of FIG. 13 illustrates the waveform of the regenerative current IL flowing through the inductor 35 of the electric power regeneration circuit 30. FIG. 13 corresponds to FIG. 6 of the foregoing example embodiment.

The control circuit 60 may generate the control signals G11 to G16, based on the voltage VL (parts (A) to (F) of FIG. 13). The electric power conversion apparatus 50 may perform a switching operation, based on the above-described control signals G11 to G16 to thereby perform an electric power conversion operation of converting electric power supplied from the high voltage battery BH and supplying the converted electric power to the low voltage battery BL. In addition, the electric power conversion apparatus 50 may so control respective duty ratios of the control signals G11 to G16 as to cause the voltage VL to remain at the predetermined voltage.

The electric power regeneration circuit 30 may operate to allow energy of a surge voltage that occurs in each of the transistors Q15 and Q16 to be regenerated. The energy of the surge voltage that occurs in the transistor Q15 may be supplied to the capacitor 33 of the electric power regeneration circuit 30 via the diode 31, and may be temporarily stored in the capacitor 33. The energy of the surge voltage that occurs in the transistor Q16 may be supplied to the capacitor 33 of the electric power regeneration circuit 30 via the diode 32, and may be temporarily stored in the capacitor 33. The control circuit 60 may generate the control signals G15 and G16, based on the voltage VSNB of the capacitor 33. The electric power regeneration circuit 30 may thus allow the energy of the surge voltage that occurs in each of the transistors Q15 and Q16 to be regenerated.

For example, when the control circuit 60 changes the control signal G16 from a high level to a low level at a timing t61 (part (F) of FIG. 13), a current may flow into a body diode of the transistor Q16 in this example. Thereafter, the body diode of the transistor Q16 may switch from on to off by a reverse recovery operation of the body diode. This may cause the drain-to-source voltage VdsQ16 of the transistor Q16 to increase from 0 V (part (H) of FIG. 13). The drain-to-source voltage VdsQ16 may transiently exceed the voltage VSNB of the capacitor 33 at a timing t62. In a period in which the drain-to-source voltage VdsQ16 exceeds the voltage VSNB, the diode 32 may be turned on, and a current may flow into the capacitor 33 via the diode 32. The capacitor 33 may thus be charged transiently, and the voltage VSNB of the capacitor 33 may increase (part (I) of FIG. 13). In this example, the increased voltage VSNB may be lower than the threshold voltage VthH. Thereafter, the drain-to-source voltage VdsQ16 of the transistor Q16 may decrease to 0 V in a period from a timing when the control signal G14 changes from a high level to a low level to a timing when the control signal G16 changes from the low level to the high level (part (H) of FIG. 13). Thereafter, at a timing t63, the control circuit 60 may change the control signal G16 from the low level to the high level (part (F) of FIG. 13), which may cause the transistor Q16 to switch from off to on.

Similarly, when the control circuit 60 changes the control signal G15 from a high level to a low level at a timing t64

(part (E) of FIG. 13), a current may flow into a body diode of the transistor Q15. Thereafter, the body diode of the transistor Q15 may switch from on to off by a reverse recovery operation of the body diode. This may cause the drain-to-source voltage VdsQ15 of the transistor Q15 to increase from 0 V (part (G) of FIG. 13). At a timing t65, the drain-to-source voltage VdsQ15 may transiently exceed the voltage VSNB of the capacitor 33 and the diode 31 may be turned on. The capacitor 33 may thus be charged transiently, and the voltage VSNB of the capacitor 33 may increase (part (I) of FIG. 13). In this example, the increased voltage VSNB may exceed the threshold voltage VthH at a timing t66. The control circuit 60 may generate the control signals G5 and G6, based on this voltage VSNB.

At the timing t66 at which the voltage VSNB exceeds the threshold voltage VthH, the comparator 43 may change the signal CMP from the low level to the high level (part (J) of FIG. 13). The AND circuit 45 may calculate the AND of the signal CMP and the pulse signal PLS (parts (J) and (K) of FIG. 13). The control signal generation circuit 46 may generate the control signals G5 and G6, based on the output signal from the AND circuit 45 (parts (L) and (M) of FIG. 13).

At a timing t67, the control signal generation circuit 46 may change the control signal G6 from the high level to the low level (part (M) of FIG. 13). This may cause the transistor Q6 to switch from on to off. Further, at a timing t68 at which the dead time Td has elapsed from the timing t67, the control signal generation circuit 46 may change the control signal G5 from the low level to the high level (part (L) of FIG. 13). This may cause the transistor Q5 to switch from off to on, and the regenerative current IL may flow from the capacitor 33 toward the capacitor 20 via the transistor Q5, the inductor 35, and the diode 36 (part (N) of FIG. 13). In other words, the energy of the surge voltage that occurs in each of the transistors Q15 and Q16 may be temporarily stored in the capacitor 33 of the electric power regeneration circuit 30, and may be thereafter regenerated in the capacitor 20. In a period from the timing t68 to a timing t69, the regenerative current IL may increase. Because the capacitor 33 is discharged, the voltage VSNB of the capacitor 33 may decrease toward the threshold voltage VthL (part (I) of FIG. 13).

At the timing t69, when the voltage VSNB reaches the threshold voltage VthL, the comparator 43 may change the signal CMP from the high level to the low level (part (J) of FIG. 13). In response thereto, the control signal generation circuit 46 may change the control signal G5 from the high level to the low level (part (L) of FIG. 13). This may cause the transistor Q5 to switch from on to off. Because the discharging of the capacitor 33 is stopped, the voltage VSNB may remain at substantially the same voltage as the threshold voltage VthL (part (I) of FIG. 13). Further, at a timing t70 at which the dead time Td has elapsed from the timing t69, the control signal generation circuit 46 may change the control signal G6 from the low level to the high level (part (M) of FIG. 13). This may cause the transistor Q6 to switch from off to on. In a period from the timing t69 to a timing t71, the regenerative current IL may decrease (part (N) of FIG. 13).

The electric power regeneration circuit 30 may thus allow the energy of the surge voltage that occurs in each of the transistors Q15 and Q16 to be regenerated.

Next, a description will be given of an operation of the electric power conversion system 2 when the voltage VH is higher than the normal operation voltage range.

Figure 14:
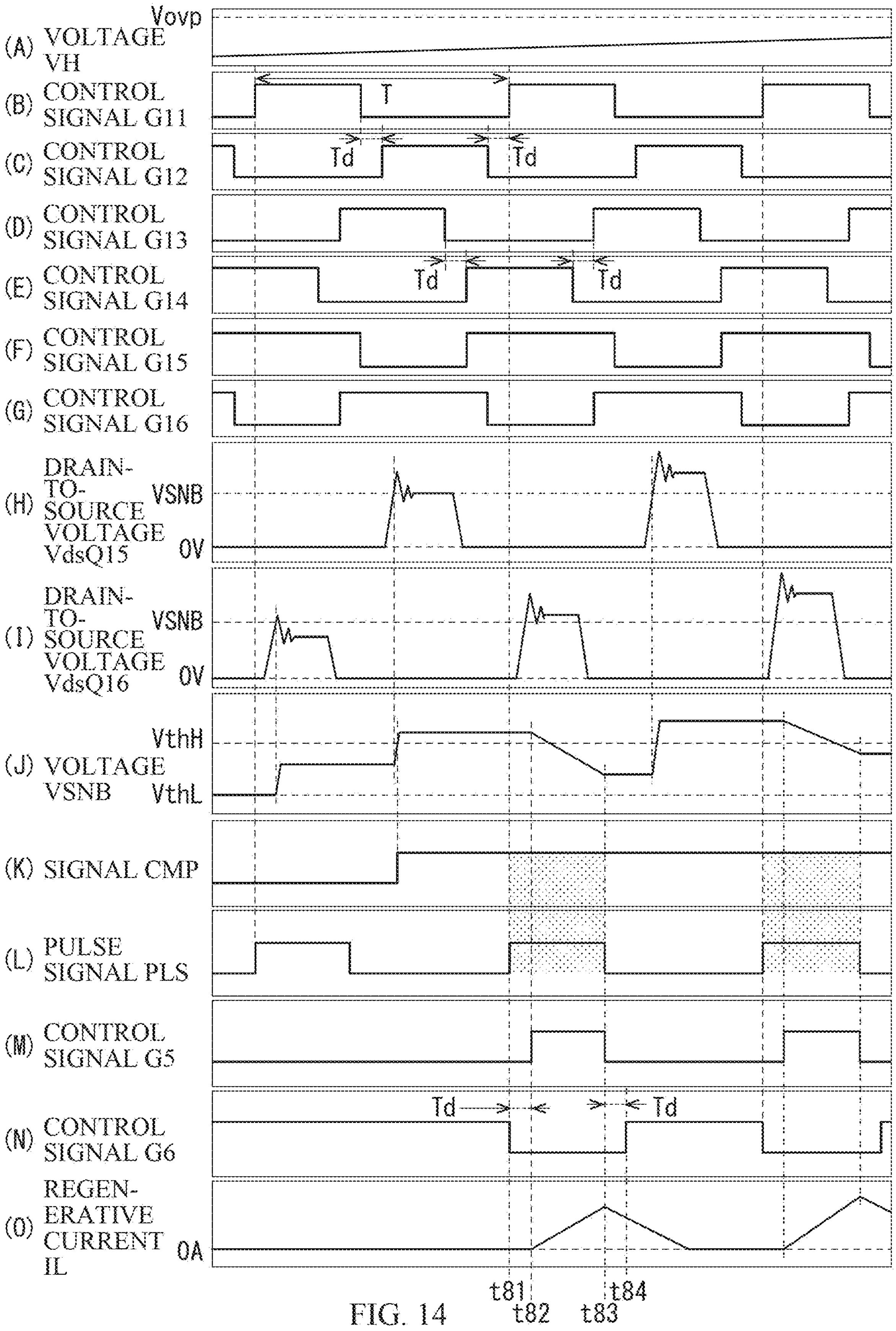
FIG. 14 is a timing waveform diagram illustrating another operation example of the electric power conversion system illustrated in FIG. 11.

FIG. 14 illustrates an operation example of the electric power conversion system 2 when the voltage VH is higher than the normal operation voltage range and lower than the maximum voltage Vovp. Part (A) of FIG. 14 illustrates the waveform of the voltage VH. Parts (B) to (G) of FIG. 14 respectively illustrate the waveforms of the control signals G11 to G16. Part (H) of FIG. 14 illustrates the waveform of the drain-to-source voltage VdsQ15 of the transistor Q15. Part (I) of FIG. 14 illustrates the waveform of the drain-to-source voltage VdsQ16 of the transistor Q16. Part (J) of FIG. 14 illustrates the waveform of the voltage VSNB of the capacitor 33 of the electric power regeneration circuit 30. Part (K) of FIG. 14 illustrates the waveform of the signal CMP. Part (L) of FIG. 14 illustrates the waveform of the pulse signal PLS. Parts (M) and (N) of FIG. 14 respectively illustrate the waveforms of the control signals G5 and G6. Part (O) of FIG. 14 illustrates the waveform of the regenerative current IL flowing through the inductor 35 of the electric power regeneration circuit 30. FIG. 14 corresponds to FIG. 7 of the foregoing example embodiment.

As illustrated in part (A) of FIG. 14, in this example, the voltage VH may increase toward the maximum voltage Vovp. The control circuit 60 may generate the control signals G11 to G16, based on the voltage VL (parts (B) to (G) of FIG. 14).

In this example, because the voltage VH gradually increases, a voltage across the winding 56B of the transformer 56 may also gradually increase. Accordingly, the drain-to-source voltage VdsQ15 of the transistor Q15 may gradually increase in a period in which the transistor Q15 is off, and the drain-to-source voltage VdsQ16 of the transistor Q16 may gradually increase in the period in which the transistor Q16 is off (parts (F) to (I) of FIG. 14). Further, the drain-to-source voltage VdsQ15 and the drain-to-source voltage VdsQ16 may each exceed the voltage VSNB of the capacitor 33. When the drain-to-source voltage VdsQ15 exceeds the voltage VSNB, the diode 31 may be turned on, and when the drain-to-source voltage VdsQ16 exceeds the voltage VSNB, the diode 32 may be turned on. The capacitor 33 may thus be charged, and the voltage VSNB may increase (part (J) of FIG. 14). In this example, except during an initial period in FIG. 14, the voltage VSNB may be higher than the threshold voltage VthL, and the comparator 43 may thus maintain the signal CMP at the high level (part (K) of FIG. 14). The AND circuit 45 may calculate the AND of the signal CMP and the pulse signal PLS (parts (K) and (L) of FIG. 14). Because the signal CMP is maintained at the high level, the output signal from the AND circuit 45 may have a waveform substantially the same as that of the pulse signal PLS. The control signal generation circuit 46 may generate the control signals G5 and G6, based on the output signal from the AND circuit 45 (parts (M) and (N) of FIG. 14). For example, the control signal generation circuit 46 may change the control signal G6 from the high level to the low level at a timing t81, and may change the control signal G5 from the low level to the high level at a timing t82 at which the dead time Td has elapsed from the timing t81. Further, the control signal generation circuit 46 may change the control signal G5 from the high level to the low level at a timing t83, and may change the control signal G6 from the low level to the high level at a timing t84 at which the dead time Td has elapsed from the timing t83. The transistors Q5 and Q6 may respectively operate based on the control signals G5 and G6. The regenerative current IL may increase in a period in which the control signal G5 is at the high level, and may thereafter decrease (part (O) of FIG. 14).

The disclosure has been described hereinabove with reference to the example embodiment and the modification examples. However, the disclosure is not limited thereto, and various modifications may be made.

For example, in the foregoing example embodiment, a step-down operation may be performed in the electric power conversion operation of the electric power conversion system 1; however, this is non-limiting. In some embodiments, a step-up operation may be performed.

The disclosure encompasses any possible combination of some or all of the various embodiments and the modification examples described herein and incorporated herein. It is possible to achieve at least the following configurations from the foregoing example embodiments and modification examples of the disclosure.

(1)

An electric power conversion apparatus including:

a first electric power terminal;

a switching circuit coupled to the first electric power terminal;

a transformer including a first winding and a second winding, the first winding being led to the switching circuit;

a rectifying circuit coupled to the second winding and including one or more rectification switching devices;

a smoothing circuit including a first inductor and a first capacitor, the first inductor having a first end and a second end, the first capacitor having a first end coupled to the second end of the first inductor, and a second end coupled to a reference node;

an electric power regeneration circuit coupled to the rectifying circuit and configured to allow energy of a surge voltage that occurs in the rectifying circuit to be regenerated in the first capacitor;

a control circuit configured to control an operation of each of the switching circuit, the rectifying circuit, and the electric power regeneration circuit; and a second electric power terminal including a first coupling terminal and a second coupling terminal, the first coupling terminal being coupled to the second end of the first inductor and the first end of the first capacitor, the second coupling terminal being coupled to the reference node, in which the electric power regeneration circuit includes a diode circuit provided on a path coupling the rectifying circuit and a first node to each other, the diode circuit being configured to allow a current to flow toward the first node, a second capacitor having a first end coupled to the first node, and a second end coupled to the reference node, a first regeneration switching device having a first end coupled to the first node, and a second end coupled to a second node, a second regeneration switching device having a first end coupled to the second node, and a second end coupled to the reference node, and a second inductor and a first diode provided on a path coupling the second node and the first end of the first capacitor to each other, the control circuit is configured to, when a voltage at the first node increases and exceeds a threshold voltage, cause the first regeneration switching device to switch from off to on and cause the second regeneration switching device to switch from on to off, a first positive voltage and a first negative voltage are to alternately occur across the second winding, when an input voltage inputted to the first electric power terminal is within a normal operation voltage range, and the threshold voltage is higher than each of a voltage at the rectifying circuit corresponding to an average value of the first positive voltage and a voltage at the rectifying circuit corresponding to an average value of the first negative voltage.

(2)

The electric power conversion apparatus according to (1), in which the second winding has a first end coupled to the first end of the first inductor, and a second end, the one or more rectification switching devices include a first rectification switching device and a second rectification switching device, the first rectification switching device having a first end coupled to the second end of the second winding, and a second end coupled to the reference node, the second rectification switching device having a first end coupled to the first end of the second winding, and a second end coupled to the reference node, and the diode circuit includes a second diode having an anode coupled to the first end of the first rectification switching device, and a cathode coupled to the first node, and a third diode having an anode coupled to the first end of the second rectification switching device, and a cathode coupled to the first node.

(3)

The electric power conversion apparatus according to (1), in which the transformer further includes a third winding, the second winding has a first end coupled to the first end of the first inductor, and a second end, the third winding has a first end, and a second end coupled to the first end of the first inductor, the one or more rectification switching devices include a first rectification switching device and a second rectification switching device, the first rectification switching device having a first end coupled to the second end of the second winding, and a second end coupled to the reference node, the second rectification switching device having a first end coupled to the first end of the third winding, and a second end coupled to the reference node, and the diode circuit includes a second diode having an anode coupled to the first end of the first rectification switching device, and a cathode coupled to the first node, and a third diode having an anode coupled to the first end of the second rectification switching device, and a cathode coupled to the first node.

(4)

The electric power conversion apparatus according to (2) or (3), in which the control circuit is configured to generate a comparison result signal by comparing the voltage at the first node and the threshold voltage with each other, generate a pulse signal, calculate an AND of the comparison result signal and the pulse signal, and control an operation of each of the first regeneration switching device and the second regeneration switching device, based on a signal indicating the AND.

(5)

The electric power conversion apparatus according to (4), in which a length of a period during which the first regeneration switching device is to be on is shorter than a pulse width of the pulse signal.

(6)

The electric power conversion apparatus according to (4) or (5), in which the pulse signal is synchronizable with a switching operation to be performed by the switching circuit.

(7)

The electric power conversion apparatus according to any one of (1) to (6), in which the threshold voltage includes a first threshold voltage and a second threshold voltage that is lower than the first threshold voltage, and the control circuit is configured to, in comparing the voltage at the first node and the threshold voltage with each other, when the voltage at the first node increases and exceeds the first threshold voltage, cause the first regeneration switching device to switch from off to on, and cause the second regeneration switching device to switch from on to off, and when the voltage at the first node decreases and falls below the second threshold voltage, cause the first regeneration switching device to switch from on to off, and cause the second regeneration switching device to switch from off to on.

(8)

The electric power conversion apparatus according to any one of (1) to (7), in which the control circuit is configured to, when the input voltage exceeds a predetermined voltage higher than the normal operation voltage range, stop the operation of each of the switching circuit, the rectifying circuit, and the electric power regeneration circuit, a second positive voltage and a second negative voltage are to alternately occur across the second winding, when the input voltage is the predetermined voltage, and the threshold voltage is lower than a higher one of a voltage at the rectifying circuit corresponding to an average value of the second positive voltage and a voltage at the rectifying circuit corresponding to an average value of the second negative voltage.

(9)

The electric power conversion apparatus according to any one of (1) to (8), in which the second inductor includes an integrally molded metal inductor.

(10)

An electric power conversion system including the electric power conversion apparatus according to (1).

An electric power conversion apparatus and an electric power conversion system according to at least one embodiment of the disclosure make it possible to protect a circuit even upon a sharp change in input voltage.

The effects described herein are mere examples, and effects of an embodiment of the disclosure are not limited thereto. Accordingly, any other effect may be obtained in relation to the embodiment of the disclosure.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a," "an," and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer or step but not the exclusion of any other non-stated element, integer or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

What is claimed is:

1. An electric power conversion apparatus comprising:

a first electric power terminal;

a switching circuit coupled to the first electric power terminal;

a transformer including a first winding and a second winding, the first winding being led to the switching circuit;

a rectifying circuit coupled to the second winding and including one or more rectification switching devices;

a smoothing circuit including a first inductor and a first capacitor, the first inductor having a first end and a second end, the first capacitor having a first end coupled to the second end of the first inductor, and a second end coupled to a reference node;

an electric power regeneration circuit coupled to the rectifying circuit and configured to allow energy of a surge voltage that occurs in the rectifying circuit to be regenerated in the first capacitor;

a control circuit configured to control an operation of each of the switching circuit, the rectifying circuit, and the electric power regeneration circuit; and a second electric power terminal including a first coupling terminal and a second coupling terminal, the first coupling terminal being coupled to the second end of the first inductor and the first end of the first capacitor, the second coupling terminal being coupled to the reference node, wherein the electric power regeneration circuit includes a diode circuit provided on a path coupling the rectifying circuit and a first node to each other, the diode circuit being configured to allow a current to flow toward the first node, a second capacitor having a first end coupled to the first node, and a second end coupled to the reference node, a first regeneration switching device having a first end coupled to the first node, and a second end coupled to a second node, a second regeneration switching device having a first end coupled to the second node, and a second end coupled to the reference node, and a second inductor and a first diode provided on a path coupling the second node and the first end of the first capacitor to each other, the control circuit is configured to, when a voltage at the first node increases and exceeds a threshold voltage, cause the first regeneration switching device to switch from off to on and cause the second regeneration switching device to switch from on to off, a first positive voltage and a first negative voltage are to alternately occur across the second winding, when an input voltage inputted to the first electric power terminal is within a normal operation voltage range, and the threshold voltage is higher than each of a voltage at the rectifying circuit corresponding to an average value of the first positive voltage and a voltage at the rectifying circuit corresponding to an average value of the first negative voltage.

2. The electric power conversion apparatus according to claim 1, wherein the second winding has a first end coupled to the first end of the first inductor, and a second end, the one or more rectification switching devices include a first rectification switching device and a second rectification switching device, the first rectification switching device having a first end coupled to the second end of the second winding, and a second end coupled to the reference node, the second rectification switching device having a first end coupled to the first end of the second winding, and a second end coupled to the reference node, and the diode circuit includes a second diode having an anode coupled to the first end of the first rectification switching device, and a cathode coupled to the first node, and a third diode having an anode coupled to the first end of the second rectification switching device, and a cathode coupled to the first node.

3. The electric power conversion apparatus according to claim 1, wherein the transformer further includes a third winding, the second winding has a first end coupled to the first end of the first inductor, and a second end, the third winding has a first end, and a second end coupled to the first end of the first inductor, the one or more rectification switching devices include a first rectification switching device and a second rectification switching device, the first rectification switching device having a first end coupled to the second end of the second winding, and a second end coupled to the reference node, the second rectification switching device having a first end coupled to the first end of the third winding, and a second end coupled to the reference node, and the diode circuit includes a second diode having an anode coupled to the first end of the first rectification switching device, and a cathode coupled to the first node, and a third diode having an anode coupled to the first end of the second rectification switching device, and a cathode coupled to the first node.

4. The electric power conversion apparatus according to claim 2, wherein the control circuit is configured to generate a comparison result signal by comparing the voltage at the first node and the threshold voltage with each other, generate a pulse signal, calculate an AND of the comparison result signal and the pulse signal, and control an operation of each of the first regeneration switching device and the second regeneration switching device, based on a signal indicating the AND.

5. The electric power conversion apparatus according to claim 4, wherein a length of a period during which the first regeneration switching device is to be on is shorter than a pulse width of the pulse signal.

6. The electric power conversion apparatus according to claim 4, wherein the pulse signal is synchronizable with a switching operation to be performed by the switching circuit.

7. The electric power conversion apparatus according to claim 1, wherein the threshold voltage includes a first threshold voltage and a second threshold voltage that is lower than the first threshold voltage, and the control circuit is configured to, in comparing the voltage at the first node and the threshold voltage with each other, when the voltage at the first node increases and exceeds the first threshold voltage, cause the first regeneration switching device to switch from off to on, and cause the second regeneration switching device to switch from on to off, and when the voltage at the first node decreases and falls below the second threshold voltage, cause the first regeneration switching device to switch from on to off, and cause the second regeneration switching device to switch from off to on.

8. The electric power conversion apparatus according to claim 1, wherein the control circuit is configured to, when the input voltage exceeds a predetermined voltage higher than the normal operation voltage range, stop the operation of each of the switching circuit, the rectifying circuit, and the electric power regeneration circuit, a second positive voltage and a second negative voltage are to alternately occur across the second winding, when the input voltage is the predetermined voltage, and the threshold voltage is lower than a higher one of a voltage at the rectifying circuit corresponding to an average value of the second positive voltage and a voltage at the rectifying circuit corresponding to an average value of the second negative voltage.

9. The electric power conversion apparatus according to claim 1, wherein the second inductor comprises an integrally molded metal inductor.

10. An electric power conversion system comprising the electric power conversion apparatus according to claim 1.

* * * * *